US012811354B2

(12) United States Patent
Itschner

(10) Patent No.: US 12,811,354 B2
(45) Date of Patent: Nov. 24, 2026

(54) ELECTRICAL CONNECTOR AND COUNTER CONNECTOR

(71) Applicant: itschner connect AG, Zürich (CH)

(72) Inventor: Roland Itschner, Zürich (CH)

(73) Assignee: ITSCHNER CONNECT AG, Zurich (CH)

( * ) Notice: Subject to any disclaimer, the term of this patent is extended or adjusted under 35 U.S.C. 154(b) by 339 days.

(21) Appl. No.: 18/293,404

(22) PCT Filed: Aug. 4, 2022

(86) PCT No.: PCT/EP2022/071949
§ 371 (c)(1),
(2) Date: Jan. 30, 2024

(87) PCT Pub. No.: WO2023/012276
PCT Pub. Date: Feb. 9, 2023

(65) Prior Publication Data

US 2024/0332875 A1 Oct. 3, 2024

(30) Foreign Application Priority Data

Aug. 5, 2021 (EP) .................................... 21189826

(51) Int. Cl.
*H01R 25/14* (2006.01)

(52) U.S. Cl.
CPC .................................. *H01R 25/142* (2013.01)

(58) Field of Classification Search
CPC .... H01R 25/142; H01R 25/16; H01R 24/005; F21V 21/35; F21V 23/06; F21S 8/06
See application file for complete search history.

(56) References Cited

U.S. PATENT DOCUMENTS 2,441,461 A 5/1948 Wayne
3,089,042 A 5/1963 Hickey et al.
(Continued)

FOREIGN PATENT DOCUMENTS

CH 378969 8/1964
CH 458168 8/1968
(Continued)

OTHER PUBLICATIONS

International Search Report issued in PCT/EP2022/071949, mailed on Dec. 1, 2022.

*Primary Examiner* — Truc T Nguyen
(74) *Attorney, Agent, or Firm* — DILWORTH IP, LLC

(57) ABSTRACT

Electrical connector elements and electrical counter connector elements for coupling with each other. The electrical connector element includes an elongated connector element body and an insertion part that may be received in a receiving aperture of the counter connector element. The electrical connector element includes an engagement step with an engagement step surface at the transition of the connector element body and the insertion part. The electrical connector element and counter connector element include a corresponding main connector element contact and counter connector element contact. When inserting the insertion part into a receiving room of the electrical counter connector, a counter connector element front member of the counter connector element engages with the engagement step and the main connector element contact frontally contacts the counter connector element contact and an electrical connection as well as a simultaneous mechanical coupling is established.

19 Claims, 15 Drawing Sheets

(56) References Cited

U.S. PATENT DOCUMENTS

| | | | | |
|---|---|---|---|---|
| 3,154,646 | A | 10/1964 | Jurca et al. | |
| 3,484,984 | A | 12/1969 | Fischer | |
| 3,836,885 | A | 9/1974 | Larsile | |
| 4,729,742 | A * | 3/1988 | Onishi | H01R 25/14 439/94 |
| 4,749,358 | A * | 6/1988 | Soleanski | A47G 1/1686 439/119 |
| 4,781,609 | A * | 11/1988 | Wilson | H01R 29/00 439/174 |
| 4,822,292 | A | 4/1989 | Thayer et al. | |
| 4,907,137 | A * | 3/1990 | Schladitz | F21V 29/505 362/147 |
| 5,049,081 | A * | 9/1991 | Ribitsch | F21V 21/35 362/249.11 |
| 5,162,616 | A * | 11/1992 | Swaffield | H01R 25/14 174/70 B |
| 5,273,452 | A * | 12/1993 | Donato | F21V 29/83 439/339 |
| 5,341,276 | A | 8/1994 | Shen | |
| 5,833,358 | A * | 11/1998 | Patik | F21V 21/35 362/648 |
| 6,079,992 | A * | 6/2000 | Kuchar | F21V 21/30 439/110 |
| 6,491,410 | B2 * | 12/2002 | Ladstatter | F21S 4/20 362/147 |
| 6,527,565 | B1 | 3/2003 | Johns | |
| 11,287,122 | B1 * | 3/2022 | Hendler | H01R 25/14 |
| 2002/0137374 | A1 * | 9/2002 | O'Rourke | F21V 23/02 439/121 |
| 2003/0060067 | A1 | 3/2003 | Kerr, Jr. | |
| 2003/0176088 | A1 * | 9/2003 | Truggelmann | H01R 25/147 439/110 |
| 2003/0179578 | A1 * | 9/2003 | Albert | F21V 21/15 362/147 |
| 2003/0207612 | A1 | 11/2003 | McCoy | |
| 2004/0160767 | A1 * | 8/2004 | Mobarak | F21V 21/35 362/219 |
| 2007/0123075 | A1 * | 5/2007 | Insalaco | H02G 3/388 439/120 |
| 2007/0194526 | A1 | 8/2007 | Randall | |
| 2010/0055947 | A1 * | 3/2010 | Fong | H01R 25/142 439/116 |
| 2012/0094512 | A1 * | 4/2012 | Northey | H01R 12/724 439/119 |
| 2014/0370730 | A1 | 12/2014 | Flynn et al. | |
| 2015/0024615 | A1 * | 1/2015 | Lindblom | H01R 13/62 439/121 |
| 2015/0198311 | A1 * | 7/2015 | O'Brien | F21S 8/066 362/220 |
| 2016/0365691 | A1 | 12/2016 | Khazeni | |
| 2019/0072249 | A1 * | 3/2019 | Bobbo | E04B 9/006 |
| 2025/0369604 | A1 * | 12/2025 | Leonardo | F21V 21/35 |

FOREIGN PATENT DOCUMENTS

| | | | |
|---|---|---|---|
| CH | 709660 | A2 | 11/2015 |
| CN | 210350314 | U | 4/2020 |
| DE | 9004111 | U1 | 6/1990 |
| DE | 4302560 | C1 | 4/1994 |
| DE | 29815346 | U1 | 12/1998 |
| DE | 19911860 | A1 | 12/2000 |
| DE | 202019100202 | U1 | 4/2019 |
| DE | 102019004574 | A1 | 12/2020 |
| EP | 3321569 | A1 | 5/2018 |
| EP | 3461376 | A1 | 4/2019 |
| FR | 2188912 | | 1/1974 |
| FR | 2646736 | A1 | 11/1990 |
| GB | 1000924 | | 8/1965 |
| WO | 9417328 | | 8/1994 |
| WO | 9612327 | | 4/1996 |
| WO | 2006124539 | A2 | 11/2006 |
| WO | 2013087081 | A1 | 6/2013 |
| WO | 2019224749 | A1 | 11/2019 |

* cited by examiner

ELECTRICAL CONNECTOR AND COUNTER CONNECTOR

FIELD OF THE INVENTION

The present invention relates to the field of electrical connector devices, in particular of the plug-and socket type. The invention concerns electrical connector elements, electrical connectors, electrical counter connectors and counter connector arrangements with a number of counter connectors. The invention is useful in particular for providing electrical power to electrically powered devices, such as, for example, lamps respectively lighting devices.

BACKGROUND OF THE INVENTION

In the state of the art, a large number of arrangements and systems for connecting electrical load devices are known. Widely used for example, are installation sockets that are mounted in a wall or ceiling and which provide an interface between a mains power supply of an electrical load. Loads that are typically mounted to a wall or ceiling, such as a lamp, may be mounted or hang up on a holder placed on the ceiling by means of a hook which may be arranged in the installation socket. Further, electrical devices such as lamps may be mechanically mounted separately. All of such installations have the disadvantage that they are generally inflexible regarding the number of loads respectively electrical devices as well as their arrangement. Once the electrical device has been mounted, it is no longer possible to change the position of the electrical load without effort and the acceptance of visible non-used mounting points such as drill holes.

For temporary used electrical devices and/or devices that may be used at different locations, electrical plugs and sockets are known and widely used. In this case, however, an electrical cable is required between the electrical device and the socket which is often undesirable and even dangerous in some situations.

SUMMARY OF THE INVENTION

In particular, for some types of electrical devices, such as lamps, for example halogen or LED based lamps, rail-based systems are known in which wall- or ceiling-mounted rails with integrated conductors are used for connecting electrical loads. Similarly, arrangements with mechanically tensioned wires are known to connect in particular low voltage devices, such has low voltage halogen or LED lamps.

While offering some flexibility regarding the number of electrical devices, e.g. lamps, as well as their positioning, the flexibility is still comparatively limited, in particular regarding the weight, orientation and number of electrical devices, since the rails or wires generally also serve the purpose of mechanically mounting the electrical devices and the extension direction of the rails or wires, typically straight, restricts the mounting the electrical devices.

It is an overall objective of the present invention to improve the state of the art regarding the electrical connection of electrical devices. Favorably, one or more of the before mentioned disadvantages of the prior art are overcome fully or partly.

In a general way, the overall objective is achieved by the subject of the independent claims. Particularly advantageous embodiments are defined by the dependent claims, as well as the overall disclosure.

As will become appear that in the following, the invention may in particular allow electrical devices to be attached on ceilings, walls or floors in different orientations, for example in a hanging, horizontal, standing or in any other orientation, and at different positions. Also, arrangements are possible with an electrical connection and a simultaneous mechanical attachment respectively mounting.

Thorough the present description, a number of directional terms with “proximal” respectively “distal” is used. It is noted that an electrical connector element according to the present disclosure, and an electrical counter connector element respectively socket element, as well as an electrical connector with at least two electrical connector elements and an electrical counter connector arrangement with a number of counter connector elements generally have in each case separate proximal respectively distal directions and are generally specifically indicated and distinguished. In an operational configuration respectively in use, however, such directions are generally aligned or substantially aligned. The terms “proximal” and “distal” may accordingly be used without further specification.

In an aspect, the overall objective is achieved by an electrical connector element, in particular a plug element, for coupling with an electrical counter connector element and/or an electrical counter connector arrangement in accordance with the present disclosure. The electrical connector element includes an elongated connector element body. The connector element body extends along a connector element axis. The connector element axis defines a proximal connector element direction and a distal connector element direction opposite to the proximal connector element direction. Typically, the connector element body length may be in a range of, for example 20 mm to 80 mm. A suited size and dimensioning of the electrical connector element and in particular the connector element body generally depends on factors such as the handling, in particular manual handling by user, as well as the voltage and current, respectively power. In a typical design, the connector element body respectively electrical connector element is designed and dimensioned to be grasped and manipulated via the hand of a user. In an embodiment, the connector element body forms a housing or part of a housing of the electrical connector element.

The electrical connector element includes an insertion part. The insertion part is distally adjacent to the connector element body. An engagement step with an engagement step surface is formed at a transition from the connector element body to the insertion part. The engagement step surface extends in a connector element engagement direction transverse to the connector element axis and outwards with respect to the connector element body respectively away from the connector element body, with the normal direction of the engagement step surface pointing proximally. The connector element engagement direction and accordingly the extension direction of the engagement step surface may be right angled or substantially right angled but also oblique with respect to the connector element axis. In the case of an oblique engagement step surface, the engagement step surface may in particular be inclined in the proximal connector element direction, respectively away from the insertion part. Typically, the extension of the insertion part in the connector element engagement direction may be in a range of 2 mm to 20 mm, while other dimensions may be used as well in dependence of the overall design, application as well as the voltage and current, respectively power.

An end of the electrical connector element where the insertion part is arranged is referred to as distal connector element end while an opposite end along the longitudinal connector element axis is referred to as proximal connector element end.

The engagement step is formed, in combination by the engagement step surface and an adjacent surface element of the connector element, in particular a surface element of the connector element body. In a particular design as discussed further below, the engagement step is formed in combination, by adjacent surface elements of an engagement auxiliary connector element contact.

In an embodiment, the connector element body and the insertion part are formed fully or partly integrally, but may also be realized as separate parts that are attached respectively mounted to each other.

The connector element body and/or the insertion part may be made from electrical non-conductive materials such as plastics and/or ceramics, or the connector element body and the insertion part may be enclosed by a non-conductive material. However, the connector element body and/or the insertion part may also be generally made from conductive material, such as aluminum or copper without additional isolation as mentioned before. Such design may be used, e.g. in low voltage applications as well as in designs with a grounding contact as explained further below.

The connector element body and/or the insertion part may be formed from a single component or assembled from a number of more than one components from the same or different material.

In a particular embodiment, the connector element body and the insertion part include at least one integrally formed plastic component, in particular injection molded plastic component, and further at least one metal component that may for example be made from sheet metal, in particular press-bent part. Either or both of the at least one plastic component and the at least one metal component may partly belong to the connector element body and partly to the insertion part.

The engagement step, in particular the engagement step surface, may be formed by a plastic component, a metal component or partly by both. In an embodiment, the metal component is bent, for example but not necessarily, at a right angle, thereby forming the engagement step. In an embodiment, the metal component or at least one metal component also serves as auxiliary connector element contact, for example as grounding contact, as discussed further below.

In particular in the context of an electrical connector as discussed further below, the connector element body or part thereof may be formed integrally with further elements of the electrical connector, in particular with the connector element body of a further electrical connector element and/or a base body of the electrical connector.

Further, the electrical connector element includes a main connector element contact. The main connector element contact has a main connector element contact surface. The main connector element contact surface is arranged at the insertion part. When coupling the electrical connector element with an electrical counter connector element as discussed further below, the main connector element contact surface and a main counter connector element contact surface of the electrical counter connector element establish an electrical contact. The main connector element contact surface is frontally contactable by a movement of the electrical connector element in the connector element engagement direction.

The expression "frontally" means that the connection with the main counter connector element contact of the electrical counter connector element is a face-contact, respectively transverse or normal to the extension of the main contact element surface.

The main connector element contact is made from an electrically conductive material as generally known and used in the art for electrical contacts, such as copper, aluminum and steel. Furthermore, the main connector element contact, in particular the connector element contact surface, is typically arranged electrically insulating with respect to other parts of the electrical connector element, in particular the connector element body and a body of the insertion part and is further electrically insulated with respect to optional auxiliary connector element contacts as explained further below.

In an embodiment, the main connector element contact is supported or carried by an insulating member, for example plastic component of the connector element, in particular a plastic component of the connector element body and/or the insertion part as discussed before as well as further below. Such insulating member may also serve the purpose of insulating the main connector element contact with respect to auxiliary connector element contacts. In embodiment, the insulating member partly belongs to the connector element body and partly to the insertion part, respectively is shared between the connector element body and the insertion part.

In an embodiment, the main connector element contact extends at least partly within an insulating member, for example a plastic component, of the connector element as mentioned before.

In an embodiment, the main connector element contact is made from sheet metal. The main connector element contact may, e.g., be an L-shaped or substantially L-shaped and typically elongated sheet metal part having a first leg and a second leg. The first leg extends along respectively parallel to the connector element axis. The main connector element contact surface is formed by a front surface of the second leg in a viewing direction aligned with and generally against the connector element engagement direction. In a typical variant of such design, the main connector element is an elongated sheet metal part and the first leg is a longer leg and the second leg is a shorter leg. For such design, the area of the main connector element contact surface is generally rectangular, having a height corresponding to the sheet metal thickness and a length corresponding to the width of the sheet metal part, transverse to the connector element axis.

In an embodiment, the electrical connector element includes a mounting member. In a particular design, the mounting member is an elongated member, in particular tongue-shaped member and extends at least substantially along the connector element axis. The mounting member may for example be leaf-shaped or tongue shaped and be part of the connector element body or project from the connector element body in proximal connector element direction. A proximal end of the mounting member may be connected respectively attached to a base element, for example a base element of an electrical connector as discussed further below. The mounting member may be fully or in part flexible, in particular bendable. The mounting member may be connected to a base element of an electrical connector. The mounting member may be a separate element or may be formed integrally with the connector element body respectively be a part of the connector element body, in particular a plastic component thereof, for example an insulating member as mentioned before.

Displacing the electrical connector element in the connector element engagement direction for coupling with a counter connector element as described further below may be associated with a deformation, in particular bending deformation, of the mounting member or a part thereof, as discussed further below in more detail.

In use, the main connector element contact surface provides, together with a main counter connector element contact surface of an electrical counter connector element as discussed further below, an electrical connection.

When coupling with an electrical counter connector element, the insertion part together with the main and optional auxiliary connector element contacts respectively main and auxiliary connector element contact surfaces is inserted into a receiving aperture of the electrical counter connector element, while the connector element body is, at least partly, not inserted and accordingly remains accessible.

As explained further below in more detail, the design of an electrical connector element allows the simultaneous establishment of an electrical contact respectively electrically connecting as well as a mechanical coupling with an electrical counter connector element in a single step and accordingly a quick and simple handling.

In an embodiment, the cross section of the insertion part transverse to the connector element axis respectively in a plane comprising the connector element engagement direction is polygonal, in particular square or rectangular. Such a design is favorable regarding the mechanical connection, allows good handling and is further favorable regarding manufacture. Alternative cross sections, however, may be used as well. In an another embodiment, the cross section of the insertion part transverse to the connector element axis is circular.

It is noted that a polygonal cross section refers, where not stated differently, to the global or overall cross section. It does not exclude local deviations from the polygonal cross section, in particular the presence of elements such as protrusions or notches that may be foreseen for reverse protection purposes as discussed further below.

In an embodiment, the cross section of the insertion part transverse to the connector element axis respectively in a plane comprising the connector element engagement direction is rotationally symmetric of order two or of order four. Rotational symmetry of order two is given in particular for a rectangular cross section and rotational symmetry of order four is in particular given for a square cross section. Particular favorable characteristics and properties of such designs are discussed in more detail further below in the context of electrical counter connector elements and electrical counter connector arrangements. In a further embodiment, the cross section is strictly rotationally symmetric i.e. is circular. For such design, the shape of the insertion part and/or connector element body is accordingly cylindrical.

In an embodiment, the cross section of the connector element body and the insertion part transverse to the connector element axis is generally identical. Such design is on particular favorable if the connector element body and the insertion are formed integrally. Alternatively, however, the cross section of the connector element body and the insertion part transverse to the connector element axis may also be different from each other such as circular and square. Further, it is noted that the before-discussed cross section for the insertion part may be given for the whole or substantially whole insertion part, or for a portion thereof, in particular a proximal portion adjacent to the engagement step and comprising the engagement step surface.

In dependence of the overall design, the cross section of the connector element body and/or insertion part may be constant or vary along their length respectively along the connector element axis. Further, the connector element body and/or insertion part may be generally solid or fully or partly hollow.

In an embodiment, the electrical connector element is configured to be coupled with an electrical counter connector element in a rotationally locking manner. This is the case for example for the polygonal cross sections as described before. Similarly, a counter connector element as discussed further below in more detail may be configured for coupling with an electrical connector element in a rotationally locking manner.

In an embodiment, the electrical connector element is configured for coupling with an electrical counter connector element in a number of alternative discrete rotational orientations with respect to the connector element axis. Similarly, a counter connector element as discussed further below in more detail may be configured for coupling with an electrical connector element in a number of alternative discrete rotational orientations with respect to the counter connector element axis.

In an embodiment, the main connector element contact surface is planar respectively flat. Advantages of a planar main connector element contact surface are a large contact area and favorable and cost-efficient manufacturability.

Alternatively, however, the main connector element contact surface may have any other shape and be, for example, convexly or concavely curved.

In an embodiment, the electrical connector element further includes one or more auxiliary connector element contacts distinct from the main connector element contact. Each of the auxiliary connector element contacts has a respective auxiliary connector element contact surface arranged at the insertion part. The auxiliary connector element contacts may be made from the same kind of materials and be designed in the same manner as the main connector element contact.

Typically, the auxiliary connector element contact surfaces are planar as mentioned before in the context of the main connector element contact. Generally, however, auxiliary connector element contacts and in particular their auxiliary connector element contact surfaces may have any design as discussed before in the context of the main connector element contact surface. Further, auxiliary connector element contacts may, but are not necessarily, be designed to be frontally contacted but may, for example, also be e.g. pin-shaped or sleeve-shaped and contacted tangentially along a circumferential surface as generally known, e.g. for plug-socket connections. Further, auxiliary connector element contacts may be realized as sheet metal part, for example press-bent parts, for example as L-shaped press-bent part. The auxiliary connector element contact surface may for such design be a part of the sheet metal surface and be configured to be tangentially connected. A typical realization of such design may be in the context of an engagement auxiliary connector element contact as discussed further below. In further embodiments, however, the auxiliary contact element surface is a front surface, in particular part of the circumferential surfaces of the sheet metal part, as defined by the sheet thickness.

Auxiliary connector element contacts may be provided for example in addition to the purpose of power supply via the main connector element contact, for example for control and/or feedback purposes in order to control functions and/or receive feedback from an electrical device that is powered via the electrical connector element. In dependence of the application, auxiliary connector element contacts may be designed for currents corresponding to the main connector element contact as discussed further below, but may also be designed for other, in particular lower currents, e.g. in the range of one or few milliamps or even below.

In an embodiment, one of the additional functions of an auxiliary connector element contact may be a contact for data transmission. Data transmission contacts may be used for the control of a smart home system such as for the central control via tablet of the illumination into an on- or off-state or for a continuous dimming.

In dependence of the application, different auxiliary connector element contacts may be designed identically or differently.

In a particular embodiment, one of the auxiliary connector element contacts, in a particular design sole auxiliary connector element contact, is an electrical grounding contact and used for the same purpose as a grounding contact of a mains plug or power plug as known in the art. Such design is particularly favorable if the electrical connector element is used at a line voltage of, e.g., 110 VAC or 230 VAC. If a grounding contact is foreseen, the user-accessible parts of the electrical connector element, in particular the connector element body, may be conductive and may not be insulated or generally protected against touching by a person.

In an embodiment, an auxiliary connector element contact is formed integrally with the insertion part respectively a body of the insertion part, with an outer surface of the insertion part serving as auxiliary connector element contact surface. Such design is particularly favorable for a grounding contact.

In an embodiment, at least one auxiliary connector element contact surface is arranged at the engagement step surface and/or forms the engagement step surface fully or in part. Such auxiliary connector element contact is referred to as engagement auxiliary connector element contact. Due to this arrangement, the auxiliary connector element contact surface of the engagement auxiliary connector element contact may be safely electrically and mechanically connected to an auxiliary counter connector element contact surface by way of gravity. Such arrangement is particularly favorable for an electrical grounding contact as mentioned before. The engagement auxiliary connector element contacts may in an embodiment be realized as sheet metal part, for example press-bent sheet metal part.

In an embodiment, the engagement step surface is formed by a distal side surface or side wall of an engagement recess that is formed at the interface of the connector element body and the insertion part. The engagement step is in such embodiment formed, in combination, by the distal side surface of the engagement recess and a ground of the engagement recess. The engagement recess may in particular extent along a straight recess axis transverse to the connector element axis. The distal side surface of the engagement recess respectively the engagement step surface is typically parallel to an opposed to a proximal side surface of the engagement recess. For such design, the normal direction of the distal side surface of the engagement recess points in proximal direction proximally into the inner room of the engagement recess and the normal direction of the proximal side surface of the engagement recess points in distal direction into the inner room of the engagement recess.

Such design with an engagement recess is in particular favorable regarding the coupling with one electrical counter connector element in accordance with the present disclosure and as discussed in more detail further below.

In a further embodiment, the insertion part serves as auxiliary connector element contact and a part of its surface serves as auxiliary connector element contact surface. In such design, the insertion part and optionally also the connector element body is at least partly conductive on at least part of its surface. An auxiliary connector element contact according to this type of design is particularly suited as grounding.

In an embodiment, a main connector element coupling conductor, in particular a main connector element coupling wire is electrically connected to the main connector element contact, wherein the main connector element coupling conductor is fed through a coupling wire aperture at the proximal side of the connector element body.

In embodiments with one or more auxiliary connector element contacts, corresponding auxiliary connector element contact conductors, for example auxiliary connector element contact wires, may be present.

In an embodiment, the main connector element contact is designed for a maximal current of 1 A or 16 A, in particular 1 A or 16 A AC but optionally DC. In such design, the electrical connector element is suited for typical home appliances and electrical devices as used in a household or office, such as lamps, fans, computers, TV and HiFi equipment, etc. In further embodiments, the main connector element contact is designed for an alternating or direct current of 100 mA, 500 mA, 1 A, or 10 A. In further embodiments, the main connector element contact may be designed for any maximum current in an interval between two neighboring of the mentioned currents.

In an another aspect, the overall objective is achieved by an electrical connector, in particular a plug. The electrical connector includes a first and a second electrical connector element as discussed before. The first and the second electrical connector element may be formed at least in part integrally. In particular, the first connector element body of the first electrical connector element and the second connector element body of the second electrical connector element or parts thereof may be formed integrally. A first insertion part of the first electrical connector element and a second insertion part of the second electrical connector element are arranged on opposite sides of a longitudinal connector axis. Further, the first connector element engagement direction of the first electrical connector element and the second connector element engagement direction of the second electrical connector element alternatively either point towards each other or point away from each other and the bodies of the first and second electrical connector elements are arranged on opposite sides of the longitudinal connector axis. That the first connector element engagement direction and the second connector element engagement direction either point towards each other or point away from each other is to be understood in the way that either of both is the case in a specific design.

An end of the electrical connector where the first and second insertion part are arranged is referred to as distal connector end while an opposite end along the longitudinal connector axis is referred to as proximal connector end. A direction from the proximal connector end towards the distal connector end is referred to as distal connector direction while an opposite direction is referred to as proximal connector direction.

In an embodiment, the first electrical connector element includes a first auxiliary connector element contact and the second electrical connector element includes a second auxiliary connector element contact, wherein the first and second auxiliary connector element contact are formed in an integral manner as auxiliary contact member from a single piece of conductive material, for example a piece of e.g.

press-bent sheet metal. For such design it follows that the first and second auxiliary connector element contact are electrically connected since they form both part of the auxiliary contact member. The first and second auxiliary connector element contacts in such embodiment may in particular serve for grounding.

In an embodiment with an auxiliary contact member as mentioned, the auxiliary contact member may for example be U-shaped or substantially U-shaped, with each of its legs forming one of the first respectively second auxiliary connector element contact. The legs may be springy towards respectively away from each other. In such design, the auxiliary contact member may elastically bias the first and second electrical connector element towards each other or away from each other. In a particular design, the auxiliary contact member may integrally be a first engagement auxiliary connector element contact of the first electrical connector element and a second engagement auxiliary connector element contact of the second electrical connector element.

In an embodiment, the electrical connector includes a base element from which the first and second electrical connector elements, in particular connector element bodies, project, respectively to which the first and second electrical connector element are attached or connected. The base element connects generally the first and second electrical connector element, in particular the first and second connector element body.

In an embodiment, such base element may be arranged at a proximal side of the electrical connector respectively form a proximal end portion thereof. In an embodiment, the first and second connector element, in particular the first and second connector element body, body may in each case be at least partly formed integrally with the base element. The base element and the first and second electrical connector element may, in combination, be for example substantially U-shaped, with the base element forming the base and the first and second electrical connector elements forming the legs of the U.

In an embodiment with a base element, the connection of the base element with the first respectively second connector element may in particular be via a first respectively second mounting member of the first respectively second electrical connector element as described before. The proximal ends of the first and second mounting member may in each case be attached to respectively merge into the base element.

The electrical connector further includes a biasing member. The biasing member is connected to the first and second connector element body. The biasing member biases or is configured to bias the first insertion part of the first electrical connector element and the second insertion part of the second electrical connector element towards each other if the first and second connector element engagement direction are pointing towards each other. Alternatively, the biasing member biases, in particular elastically biases, the first insertion part of the first electrical connector element and the second insertion part of the second electrical connector element away from each other if the first and second connector element engagement direction are pointing away from each other. The biasing may in particular but not necessarily be an elastic biasing.

Typically, the engagement step surfaces are aligned with each other along the longitudinal connector axis. Such a design facilitates the insertion of the insertion part of both electrical connector elements of an electrical connector into receiving apertures of an electrical counter connector arrangement.

When coupling the electrical connector with an electrical counter connector arrangement respectively coupling each of the first and second electrical connector element with a respective electrical counter connector element as discussed further below, a biasing force that is exerted by the biasing member ensures that the main and optional auxiliary connector element contact surfaces are in a close and stable contact to main and auxiliary counter connector element contact surfaces as discussed further below, thereby ensuring a stable electrical contact of low resistance. Further, the biasing force ensures a stable mechanical coupling between electrical connector elements and electrical counter connector elements. In dependence of the design, the mechanical coupling is sufficient to allow direct mounting of an electrical device, such as a lamp or fan exclusively via the electrical connector without requiring further mechanical mounting or attachment elements to support the electrical device with respect to gravity.

The biasing member may be an elastic biasing member or spring member and be realized or comprise, for example, as coil spring or leaf spring. In such designs the biasing member may be biased the first insertion part and the second insertion part towards each other or away from each other. In alternative embodiments, the biasing member is realized as preferably elastic or resilient tubular element, in particular as sleeve, that is arranged around the first and second connector element body on at least part of their length respectively extension with respect to the longitudinal connector axis, thereby elastically biasing the first and second connector element body towards each other. In a further variant, the biasing member is realized as elastic clamp. In a further embodiment, the biasing member is, fully or partly, realized by respectively formed integrally with an e.g. U-shaped auxiliary contact member as mentioned before.

It is noted that generally not only the first and second insertion part are biased with respect to each other, but also the first and second connector element body, and typically the first and second electrical connector element as a whole. For the coupling with an electrical counter connector element, however, the biasing of the first and second insertion part is of particular relevance.

In a further embodiment, the biasing member may be configured to provide a non-elastic biasing force. In such design, the biasing member may, for example include an outer threaded member that extends between the first and second connector element body and the first and/or second connector element body may include an inner-threaded member respectively nut member. When coupling the electrical connector with an electrical counter connector arrangement, the electrical connector may be biased with respect to the electrical counter connector arrangement by turning the screw member. In a further design, the first respectively second connector element body may include a first respectively second biasing surface, the first and second biasing surface facing each other. A biasing wedge may be arranged between and contact the first and second biasing surface. When coupling the electrical connector with a counter connector arrangement, respectively coupling each of the first and second electrical connector element with an electrical counter connector element, biasing may be achieved by displacing the biasing wedge with respect to the first and second electrical connector element respectively connector element body, e.g. by way of an adjustment screw.

In an embodiment of the electrical connector, the first electrical connector element, in particular the first connector element body and the first insertion part, are arranged on one side of the longitudinal connector axis, while the second electrical connector element, in particular the second connector element body and the second insertion part, are arranged on the other side of the longitudinal connector axis, with the longitudinal connector axis extending between them. In such embodiment, the first and second electrical connector element may in particular extend parallel to each other or somewhat oblique, generally in the same manner as tweezers-like design. In particular, for the first and second electrical connector element extending parallel to each other, the first connector element axis of the first electrical connector element and the second connector element axis of the second electrical connector element extend parallel to the longitudinal connector axis. In alternative embodiments, however, at least part of the connector element body and the insertion part may be arranged on different sides of the longitudinal connector axis for each of the first and second electrical connector element. For such design, the first and second electrical connector element cross each other, resulting in a pliers-like design.

In an embodiment, the biasing member is tubular respectively sleeve-shaped and circumferentially encompasses a portion, in particular a proximal portion, of the first and second connector element body. The biasing member of such design may be displaceable with respect to the first and second electrical connector element along the longitudinal connector axis. By displacing the biasing member with respect to the first and second electrical connector element, in particular in distal direction respectively towards an electrical counter connector arrangement as described further below, the first insertion part of the first electrical connector element and the second insertion part of the second electrical connector element are moved towards each other respectively towards the connector axis in embodiments where the first and second connector element engagement direction are pointing towards each other. Alternatively, the first insertion part of the first connector element and the second connector element of the second connector part are moved away from each other respectively away from the connector axis in embodiments where the first and second connector element engagement direction are pointing away from each other.

For moving the first and second and second insertion part into their respective connector element engagement direction, i.e. towards respectively away from each other respectively the connector axis as described, the biasing member may in an embodiment include corresponding first and second engagement pushing members for moving the first and second insertion part into their respective connector engagement direction. When displacing the biasing member as described before, the first respectively second engagement pushing member may exert in each case a pushing force on the first respectively second connector element, in particular the first respectively second connector element body. The pushing members may, for example, in each case have respective pushing surface that slides on a corresponding pushing counter-surface of the first respectively second connector element body when displacing the biasing member as mentioned before. The first pushing surface of the first pushing member and the second pushing surface of the second pushing member may in each case be inclined respectively oblique with respect to the connector axis. Other arrangements, such as a pin-groove arrangement may be used as well.

Exemplary designs with engagement pushing members are discussed further below in more detail in the context of an engagement control member.

A tubular respectively sleeve-shaped biasing member as described may also serve as gripping member respectively connector housing for gripping the electrical connector with a hand. The connector housing respectively biasing member may be made from insulating material, such as e.g. injection-molded plastics. In an embodiment, the biasing member respectively connector housing is made of two parts that are in an assembled state connected, e.g. via snap fit. Other designs may be used as well. By way of example, the connector housing may be formed from metal. The assembly of the connector housing may, in dependence of the design, e.g. also be done, e.g. by screwing, gluing or press-fitting in some embodiments.

In an embodiment, the first and second electrical connector include in each case a respective guiding member which are configured for mutual interaction, e.g. e.g. via engagement. When moving the first and second connector element respectively their insertion parts in or against their respective connector element engagement direction, the first guiding member of the first connector element and the second guiding member of the second connector element ensure a smooth movement and ensure that the connector elements respectively their insertion parts move along their respective desired trajectory thereby preventing jamming. The first and second guiding member may in an embodiment be in each case be part of respectively arranged at the respective connector element body.

In an embodiment where the first and second connector element engagement direction are pointing towards each other, the first engagement step of the first connector element and the second engagement step of the second connector element also face each other.

In reverse, in an embodiment, where the first and second connector element engagement direction are pointing from each other, the first engagement step of the first connector element and the second engagement step of the second connector element are also pointing away from each other.

In an embodiment of the electrical connector, the first and second insertion part or the first and second connector element as a whole may be arranged in each case movable towards each other and/or away from each other, respectively towards the connector axis and/or away from the connector axis by way of positive guidance. In a before-described design, the insertion parts are movable in a positively guided manner by way of the described interaction of the engagement pushing members with the connector element bodies.

In an embodiment where the first and second engagement step are pointing towards each other, moving the first and second insertion part towards each other respectively towards the longitudinal connector axis may be used for coupling respectively engaging with an electrical counter connector arrangement as described further below, while moving the first and second insertion part away from each other respectively away from each other may be used for decoupling respectively disengaging. In an embodiment where the first and second engagement step are pointing away each other, the same applies in an analogue manner in reverse.

For moving the first and second insertion part or the first and second connector element as a whole for example by way of positive guidance, the electrical connector may in some embodiments include a manually operable engagement control member. The engagement control member is configured to move, in particular simultaneously move, the first and second insertion part or the first and second connector element as a whole in their respective connector element engagement direction and alternatively against their respective connector element engagement direction. Put differently, the engagement control member may move the first and second insertion part or the first and second connector element as a whole towards each other respectively towards the longitudinal connector axis, and, alternatively, away from each other respectively away from the longitudinal connector axis. The movement may, for example be a linear movement or an arcuate respectively pincer-like movement.

In an embodiment, the first and second insertion part or the first and second connector element as a whole are movable as described by moving the engagement control member along respectively parallel to the longitudinal connector axis. In an embodiment, the first and second insertion part or the first and second connector element as a whole are movable towards each other by moving, in particular displacing, the engagement control member in the distal connector direction respectively towards the first and second insertion part. Similarly in such embodiment, the first and second insertion part or the first and second connector element as a whole are movable away from each other by moving, in particular displacing, the engagement control member in the proximal connector direction respectively away from the first and second insertion part. In an alternative embodiment, the first and second insertion part or the first and second connector element as a whole are movable towards each other by moving, in particular displacing, the engagement control member in the proximal connector direction respectively away from the first and second insertion part. Similarly in such alternative embodiment, the first and second insertion part or the first and second connector element as a whole are movable away from each other by moving, in particular displacing, the engagement control member in the distal connector direction respectively towards the first and second insertion part.

In an embodiment, a first and second engagement pushing member may be formed integrally respectively be part of the engagement control member. For moving the first and second insertion part or the first and second connector element as a whole against their connector element engagement direction, the engagement control member may include a first and second disengagement pushing members. The first respectively second disengagement pushing member be configured to exert a pushing force on the first respectively second connector element, in particular the first respectively second connector element body similar to the engagement pushing members as described before, but in each case into the opposite direction, respectively against the respective connector element engagement direction.

In an embodiment, the biasing member, for example a tubular or sleeve-like biasing member as described before, may be formed integrally with respectively serve as engagement control member and may also serve as connector housing.

In some embodiments, the electrical connector includes a linkage member that mechanically connects the first and second electrical connector element and positions them with respect to each other. The linkage member may, for example be a hinge or a linear guide. In some embodiments, the linkage member is formed by or integrally with a base element as described before.

In an embodiment of an electrical connector, the first insertion part and the second insertion part are of identical or mirror-symmetric design and identical dimensions. Typically for such embodiment, the first and second electrical connector element are as a whole of identical respectively mirror-symmetric design and identical dimensions. For such design, the first and second electrical connector element generally look alike. Such design may in particular be used for AC applications, e.g. conventional lamps as well as in DC applications where polarity is irrelevant, as discussed further below in more detail.

In alternative embodiments the first and second electrical connector element of an electrical connector are of different design and/or dimensions. By way of example, the electrical connector elements and in particular insertion parts may have different cross sectional shapes, and/or cross sectional dimensions. When coupling with an accordingly designed counter connector arrangement as discussed further below in more detail, such design ensures a defined relation between electrical connector elements on the one side and electrical counter connector elements on the other side. Such design is particularly useful for example in DC applications where polarity is relevant or if one predefined electrical connector element and one predefined counter connector element shall serve as phase respectively neutral conductor.

In further embodiment, at least one of the first and second electrical connector element includes a connector reverse coupling protection that is configured to establish a form fit with a corresponding counter reverse coupling protection of an electrical counter connector element respectively counter connector arrangement. Such reverse coupling protection may, for example, be realized by one or more concave elements, such as notches or slots that are configured for engaging with one or more convex elements, such as pins or protrusions, as counter reverse coupling protection, or vice versa. If such dedicated reverse coupling protection is foreseen, the first and second electrical connector element and in particular their insertion parts may, apart from the reverse coupling protection, optionally be of generally identical or mirror-symmetrical design and identical dimensions.

In embodiments where the first and second electrical connector element are of identical or substantially identical design, in particular shape and dimension, the electrical connector may be fully respectively substantially mirror-symmetrical with respect to the longitudinal connector axis.

In an embodiment, the electrical connector is designed for an electrical voltage between a first main connector element contact of the first electrical connector element and a second main connector element contact of the second electrical connector element of 5 VDC, 12 VDC, 24 VDC, 110 VAC or 230 VAC. In such design, the electrical connector is suited for typical home appliances and electrical devices. The given AC or DC indications are typical, but not essential. In further embodiments, the voltage is AC rather than DC or DC rather than AC. In further embodiments, the voltage may be in an interval between two neighboring of the mentioned voltages, being it AC or DC.

In a further aspect, the overall objective is achieved by an electrical device that includes an electrically powered load and further includes an electrical connector according to any embodiment as described above and/or further below. The electrical connector is connected to the electrically powered load, to provide electrical power. The electrically powered load may include at least one lighting element or a number of lighting elements, such as one or more LED(s) and/or lamps. Alternatively, or additionally, the electrically powered load may include one or more motors, heating/and or cooling devices, electric circuits, such as microcontrollers or computers, and/or audio, video, or TV devices.

In a further aspect, the overall objective is achieved by an electrical counter connector element, in particular a socket element, for coupling with an electrical connector element.

The electrical connector element may in particular be an electrical connector element in accordance with any embodiment in accordance with the present disclosure. The electrical counter connector element includes a counter connector element front member. The counter connector element front member has a proximal front member side and a thereto parallel distal front member side.

Further, the electrical counter connector element includes a receiving aperture. The receiving aperture extends continuously between the proximal and distal front member side. The counter connector element axis extends through the receiving aperture. The counter connector element axis defines a proximal counter contact element direction and a distal counter connector element direction. The distal counter connector element direction is opposite to the proximal counter connector element direction. The receiving aperture opens into a receiving room distal from the counter connector element front member. The receiving room is configured to receive the insertion part via the receiving aperture. A suited size and dimensioning of the receiving aperture and the receiving room generally depends on the size and dimension of the electrical connector element, in particular of the insertion part and is selected in dependence of the insertion part.

The electrical counter connector element further includes a main counter connector element contact. The main counter connector element contact is arranged distal from the counter connector element front member. The main counter connector element contact has a main counter connector element contact surface. The main counter connector element contact surface is laterally set back with respect to the receiving aperture and laterally delimits the receiving room. The expression "laterally" generally refers to a direction transverse to the counter connector element axis. The receiving room may generally be fully or substantially fully delimited in the lateral direction respectively circumferentially with respect to the counter connector element axis, or may be only partly delimited.

In an embodiment, the counter connector element contains a counter connector element contact carrier on which the main counter connector element contact is arranged or carried. The counter connector element contact carrier may project in distal direction from the distal front member side and may optionally be formed integrally therewith. By way of example, the counter connector element contact carrier may be formed by a wall that projects from the distal front member side in distal direction. For example in the context of an electrical counter connector arrangement as discussed further below, a spacer member may serve as counter connector element contact carrier for its counter connector elements.

By introducing the insertion part into the receiving room via the receiving aperture in the distal counter connector element direction and subsequently displacing the electrical connector element in the connector element engagement direction, the counter connector element front member engages with the connector element engagement step and the main connector element contact surface electrically contacts the main counter connector element contact surface. In a preferred embodiment, the main connector element contact surface and the main counter connector element contact surface are elastically biased in respect to each other while the biasing force acts in the direction of the respective counterpart. Specifically, a circumferential inner surface respectively inner wall of the receiving aperture, or a part thereof, may form, together with a surface or surface portion at the distal front member side adjacent to the receiving aperture, a counter engagement step.

The counter engagement step is configured to engage with the engagement step of the electrical connector element. The surface or surface portion at the distal front member side forms a counter engagement step surface and extends generally transverse to the counter connector element axis. In an engaged state, the engagement step surface abuts the counter engagement step surface, and the electrical connector element, respectively a portion of the connector element body adjacent to the insertion part, abuts the circumferential inner surface of the receiving aperture.

The receiving aperture is dimensioned and shaped to allow insertion of the insertion part and subsequently displacing the electrical connector element for establishing the engagement as explained before. Therefore, the receiving aperture is generally wider than the insertion part. In the direction corresponding to the connector element engagement direction, a dimension of the receiving aperture generally corresponds at least to the extension of the insertion part plus the extension of the engagement step surface.

Further an extension of the receiving room in the distal counter connector element direction corresponds at least to the dimension of the insertion part to allow the insertion part to be received in the receiving room. It is noted, however, that the receiving room is not necessarily distally delimited but may be fully or partly open.

The main counter connector element contact surface is made of an electrically conductive material such as the contact surface of the main connector element contact surface. Furthermore, the main counter connector element contact surface is electrically insulating with respect to other parts of the electrical counter connector element.

The counter connector element front member and the receiving aperture may be made from electrical non-conductive materials such as plastics and/or ceramics, or the counter connector element front member and the receiving aperture may be enclosed or coated by a non-conductive material. In further embodiments, however, the counter connector element front member is fully or partly electrically conductive and/or electrically coated. In such embodiments, the counter connector element front member may in particular serve grounding purposes.

In an embodiment, the main counter connector element contact surface is circumferentially continuous with respect to the receiving aperture or includes a number of main counter connector element contact surface segments which may be arranged circumferentially distributed around the receiving aperture. Typically, the main counter connector element contact surface is planar respectively its segments are planar and complement the main connector element contact surface respectively its segments. Favorably, the main connector element contact surface of the electrical connector element and the main counter connector element contact surface of the electrical counter connector element are designed for a low contact resistance and may in particular establish a surface contact in the coupled state.

In an embodiment, the counter connector element is configured for coupling with the connector element in a number of discrete rotational orientations or in a particular embodiment in any orientation. The coupling includes an electrical as well as a mechanical coupling.

In an embodiment, a contour of the receiving aperture is at least substantially polygonal, in particular square or rectangular. Such a contour is favorable regarding mechanical connection as well as the size of the surface available for the attachment of the main counter connector element contact surfaces. The contour of the receiving aperture is a circumferential contour respectively the geometric shape in a plane transverse to the counter connector element axis, in a viewing direction along the counter connector element axis. By way of example, a square or rectangular contour of the receiving aperture is favorable in a design that allows coupling with the electrical connector element in four discrete orientations, which is favorable in particular in the context of an electrical counter connector arrangement as discussed further below. In a further example, a hexagonal contour of the receiving aperture may be favorable in a design that allows coupling in six discrete orientations.

For a polygonal contour of the receiving aperture, a main counter connector element contact surface segment may be associated with respectively arranged at each of the segments of the polygon.

Regarding local deviations from a generally polygonal shape, the same applies as mentioned before for electrical connector elements in an analogue manner.

In some embodiments, the contour of the receiving aperture is shaped identical or substantially identical to the cross section of the insertion part of the electrical connector element and may both, e.g., be square or rectangular. In such design, a form fit is established between the receiving aperture and the insertion part of the electrical connector element when inserting the insertion part into the receiving room via the receiving aperture. Such design is particular favorable regarding the electrical and mechanical coupling of the electrical counter connector element and the insertion part of the electrical connector element. Alternatively, however, the contour of the receiving aperture and the cross section of the insertion part of the electrical connector element may also be different from each other such as a circular contour of the receiving aperture and a rectangular cross section of the insertion part of the electrical connector element.

In an embodiment, the contour of the receiving aperture is rotational symmetric of order two or four as discussed above in the context of electrical connector elements. For a rotational symmetry of order two, coupling between the electrical counter connector element and an electrical connector element is possible in two distinct rotational orientations that are rotated by 180 degrees with respect to each other. For a rotational symmetry of order four, coupling is possible in four distinct rotational orientations in steps of 90 degrees.

In any case, the contour of the receiving aperture is dimensioned to receive the insertion part of the electrical connector element.

In an embodiment, the electrical counter connector element further includes one or more auxiliary counter connector element contacts distinct from the main counter connector element contact. The auxiliary counter connector element contacts may be arranged distal from the counter connector element front member. In further designs, an auxiliary counter connector element contact is formed by the counter connector element front member or is part of the counter connector element front member. In an embodiment, the counter engagement step surface is also an auxiliary counter connector element contact surface.

Auxiliary counter connector element contacts may be made from the same kind of materials and be designed in the same manner as the main counter connector element contact. The auxiliary counter connector element contacts each have a respective auxiliary counter connector element contact surface that complements respectively is configured to contact the auxiliary connector element contact surface on an associated auxiliary connector element contact, typically in a one-to-one manner in a coupled state of electrical connector element and electrical counter-connector element. Further, auxiliary counter connector element contacts complement in the design of the auxiliary connector element contacts to ensure a connection of the electrical counter connector element and the electrical connector element.

In a further aspect, the overall objective is achieved by an electrical counter connector arrangement, in particular a socket arrangement for coupling with an electrical connector. The electrical counter connector arrangement includes a number of electrical counter connector elements according to any embodiment as discussed above and/or further below.

The electrical counter connector elements are divided into a first group of counter connector elements and a second group of counter connector elements. The main counter connector element contacts of all electrical counter connector elements belonging to the first group are electrically connected among each other, but not with the main counter connector element contacts of the counter connector elements belonging to the second group. Similarly, the main counter connector element contacts of all electrical counter connector elements belonging to the second group are electrically connected among each other, but not with the main counter connector element contacts of the counter connector elements belonging to the first group. Counter connector elements belonging to the first group are also referred to as first group counter connector elements, while counter connector elements belonging to the second group are also referred to as second group counter connector elements.

Typically, the counter connector element front members of some or all counter connector element are formed integrally, e.g. as a for example sheet- or plate-shaped element, but may also be realized as separate parts.

Typically, all electrical counter connector elements belonging to the first group are of identical design and dimensions among each other, and all electrical counter connector elements belonging to the second group are of identical design and dimension and may in particular have in each case an identically shaped receiving aperture. In a particular design, all counter connector elements belonging to the first as well as to the second group are designed and shaped identically and may in particular have an in each case identically shaped receiving aperture.

In an embodiment of an electrical counter connector arrangement, the electrical counter connector elements are arranged in a side-by-side arrangement as a matrix of rows and columns. The rows and the columns are equally distributed and a distance between adjacent rows corresponds to the distance between adjacent columns. Within each row and each column counter connector elements belonging to the first group are arranged with counter connector elements belonging to the second group in an alternating manner.

An electrical counter connector arrangement of this type is favorable regarding the coupling of an electrical connector and/or one or more electrical device(s) in accordance with the present disclosure with an electrical power supply in a flexible manner as explained in the following.

In an embodiment, all electrical counter connector elements may be designed identically. In an embodiment, the receiving apertures of all electrical counter connector elements further have a common orientation. In particular, a contour of the receiving aperture may have an identical orientation for all electrical counter connector elements respectively are not rotated among each other. With other words, the receiving apertures are only translator displaced with respect to each other.

In combination with the receiving apertures being rotationally symmetric of order four as explained above respectively in a design where coupling with an electrical connector is possible in four discrete orientations respectively in steps of 90 degrees, a particular characteristic of such design is as follows: The first electrical connector element may be coupled with an electrical counter connector element and the second electrical connector element may simultaneously be coupled with a second electrical counter connector element of the electrical counter connector arrangement, with the first and second electrical counter connector element being neighboring electrical counter connector elements, belonging either to one and the same row and two different, typically neighboring, columns, or vice versa. Due to the electrical counter connector elements being divided into a first group and a second group as explained before, one of the first and second electrical counter connector element belongs to the first group of electrical counter connector elements, while, the other of the first and second electrical counter connector element belongs to the second group of electrical counter connector elements. Further, the role of the first and second electrical connector element may be reversed. That is, the electrical connector respectively its first and second electrical connector element may be coupled with the same first and second electrical counter connector element in two different orientations that are rotated with respect to each other by 180 degrees. It is noted that rather than a rotational symmetry of order four, the electrical connector elements and electrical counter connector elements may be designed in strictly rotationally symmetric manner.

For an electrical counter connector arrangement with a plurality of rows and columns, such arrangement provides a particular high flexibility. Such design allows the mounting of an electrical device such as e.g. a hanging ceiling lamp with an elongated rectangular shape, at a desired position and orientation, which may further be changed at any time without further mechanical mounting. Since the first respectively second electrical connector element may equally be coupled with an electrical counter connector element belonging to the first or second group, such design is suited for AC application as well as DC applications if polarity is irrelevant. The electrical counter connector elements belonging to the first group may in such applications serve as plus terminals and the electrical counter connector elements belonging to the second group may serve as negative terminals, or vice versa.

Typically, an electrical connector is designed such that, in a coupled state, its first and second electrical connector element couple in each case with two directly neighboring electrical counter connector elements as first and second electrical counter connector element as described before. Alternatively, however, the design may be such that the first and second electrical counter connector element are not directly neighboring, but one or more counter connector elements within a row or column are skipped.

In an embodiment, the main counter connector element contacts of some or all counter connector elements belonging to the first group may be formed integrally by a common first group counter contact member, for example a common first group sheet metal component. Similarly, the main counter connector element contacts of some or all counter connector elements belonging to the second group may be formed integrally by a common second group counter contact member, for example a common second group sheet metal component. Further, the main counter connector element contacts may be formed integrally in groups, i.e. integrally for in each case a number of main counter connector elements belonging to the first respectively second group.

A first group counter contact member, in particular first group sheet metal component, may have a respective associated through-going cutout for each electrical counter connector element belonging to the first group. Similarly, a second group counter contact member, in particular second group sheet metal component, may have a respective associated through-going cutout for each electrical counter connector element belonging to the second group. Typically, a contour of such cutout as defined by its circumferential rim corresponds in each case to the contour of the receiving apertures and a center of the cutout respectively its contour is typically aligned with the counter connector element axis of the respective counter connector element.

The main counter connector element contacts of each counter connector element belonging to the first group is formed by a number of tongues or flaps that extend from a circumferential rim of the respective associated cut-out of the first group counter contact member, for example first group sheet metal component. The main counter connector element contact of each counter connector element belonging to the second group is formed by a number of tongues or flaps that extends from a circumferential rim of the respective associated through-going cut-out of the second group counter contact member, for example second group sheet metal component. The number of tongues or flaps includes a one, i.e. a single tongue or flap, but is typically larger than one, for example four. Each tongue or flap is a counter connector element contact segment.

In an embodiment, the tongues or flaps are in each case arranged circumferentially distributed along the circumferential rim of the respective associated cut-out.

An inner surface of each tongue or flap, pointing towards the counter connector element axis of the respective counter connector element, may be a counter connector element contact surface segment as described above. The portion of such sheet metal component between the tongues or flaps is referred to as base portion and may be may be flat. Such design is favorable regarding a cost-efficient manufacture. Further, the tongues or flaps may be arranged springy, thereby enabling a good and reliable electrical contact.

Favorably, main counter connector element contacts respectively contact segments, for example tongues or flaps as described, are arranged such that they are in each case resiliently deflected from their respective resting position by the main connector element contact of an electrical connector element upon coupling. They may especially be deflected away from the respective counter connector element axis. It is noted that a springy or resilient resign of the main and also optional auxiliary counter connector element contacts may also be realized differently in dependence of the overall design.

In an embodiment, the electrical counter connector arrangement includes an in particular plate-shaped spacer member. The receiving room of each electrical counter connector element is in each case at least partly formed by the spacer member as respective associated spacer member. The main counter connector element contact of each counter connector element belonging to the first group projects into the respective associated receiving room from one side, for example a proximal side, of the spacer member. The main counter connector element contact of each electrical counter connector element belonging to the second group project in each case into the respective associated receiving room from an opposite side, for example a distal side, of the spacer member. The counter connector element contacts may especially have main counter connector element segments, for example tongues or flaps, as mentioned before.

The spacer member is made from non-conductive respectively insulating material, for example plastics, and may e.g. be injection molded. The receiving rooms, for example a receiving channels, extend continuously between the proximal and distal side. The spacer member may be sandwiched between the first group counter contact member and the second group counter contact member, respectively their respective base portions.

In an embodiment with a spacer member, an in each case e.g. plate-shaped first group holding member and second group holding member is provided. The first group holding member and the second group holding member are in each case generally made from non-conductive material in the same way as the spacer member. One or both of the first group holding member and the second group holding member may further have a through-going cutout for each counter connector contact element. The first group counter contact member may be sandwiched between the first group holding member respectively its base portion and the spacer member. Similarly, the second group counter contact member may be sandwiched between the second group holding member respectively its base portion and the spacer member.

In an embodiment, the first group holding member and/or the second group holding member, in particular a peripheral part of the first group holding member and/or the second group holding member, forms an outer housing of the counter connector arrangement or part of an outer housing of the counter connector arrangement.

In an embodiment, an electrical counter connector arrangement includes at least one auxiliary counter connector contact member. The auxiliary counter connector contact member serves as integrally formed auxiliary counter connector element contact for some or all counter connector elements. The at least one auxiliary counter connector contact member is made from conductive material. The auxiliary counter connector contact member may in particular serve as auxiliary counter connector element contact for electrical counter connector elements belonging to both the first and second group. In an embodiment, an auxiliary counter connector contact member may serve as integrally formed counter connector element front members or part thereof for some or all electrical counter connector elements of the electrical counter connector arrangement. In further designs, a number of auxiliary counter connector contact members is present with each auxiliary counter connector contact member serving as auxiliary counter connector element contact for a number of electrical counter connector elements belonging to the first and/or second group.

In a particular embodiment, the at least one auxiliary counter connector contact member is plate-shaped.

In an embodiment, such auxiliary counter connector contact member may include a through-going cutout for each electrical counter connector element, with the cutouts forming in each case the receiving aperture or part of the receiving aperture of the respective electrical counter connector element.

A surface of an auxiliary counter connector contact member may serve as integrally formed auxiliary counter connector contact element surface for some or all respectively a number of the electrical counter connector elements. Such auxiliary counter connector contact member with integrally formed auxiliary counter-connector contacts and counter connector element surfaces may in a typical application serve as grounding.

In an embodiment, the auxiliary counter connector contact member may be sandwiched with an e.g. plate-shaped cover member of generally identical contour. Such cover member may in particular be in facial contact with an outwards-pining surface of auxiliary counter connector contact member and may favorably be electrically isolating.

In a particular embodiment, the electrical counter connector arrangement includes two auxiliary counter connector contact members as described before and of typically identical or substantially identical design. The auxiliary counter connector contact members may be arranged on opposite sides of a spacer member as arranged before. One of the auxiliary counter connector contact members may be adjacent respectively in contact, in particular areal contact, with a first group holding member and the other auxiliary counter connector contact member may be adjacent respectively in contact with a second group holding member as described before.

In an embodiment of the electrical counter connector arrangement, the electrical counter connector arrangement is symmetrical with respect to a symmetry plane that extends transverse, in particular orthogonal, to the electrical counter connector element axis. For such designs, proximal and distal may generally be reversed. Such design may in particular be used for coupling with electrical connectors alternatively from opposite directions with respect to proximal-distal.

A number of variations are possible for the electrical connector element arrangement. In an embodiment, the electrical counter connector elements belonging to the first respectively second group are designed differently. Within the first respectively second group, however, the electrical counter connector elements are favorably designed in an identical manner. The first electrical connector element of a corresponding electrical connector may be designed for coupling with an electrical counter connector element belonging to the first group only and the second electrical connector element of a corresponding electrical connector may be designed for coupling with an electrical counter connector element belonging to the second group only, or vice versa. The different design may be realized by different contours and/or dimensions of the receiving apertures and corresponding counter parts, in particular cross sections of the insertion parts, of the electrical connector elements. Further, it may alternatively or additionally be realized by connector reverse coupling protections and counter reverse coupling protections as explained before. Also for this type of embodiment, coupling of an electrical connector is favorable possible in four discrete orientations respectively in steps of 90 degrees. This type of embodiment is favorable for example in DC applications where the polarity is relevant.

In another embodiment of an electrical counter connector arrangement, the receiving apertures of all electrical counter connector elements are elongated, in particular slot-shaped with an e.g. rectangular contour, and extend parallel to each other in a side-by-side arrangement, wherein electrical counter connector elements belonging to the first group and electrical counter connector elements belonging to the second group are arranged in an alternating manner. Such counter connector arrangement may be installed and used in substantially the same manner as lighting rail systems. If more than one counter connector element is present, for the first and second group, respectively, i.e. more than two counter connector elements in total, the receiving apertures of all counter connector elements may be arranged equidistantly.

In a further embodiment of a counter connector arrangement, four counter connector elements are present, with two belonging to the first group and the other two belonging to the second group. The receiving apertures may have a generally L-shaped contour for all counter connector elements and the counter connector elements may be arranged in a symmetric manner with respect to a common center. In each case two counter connector elements that are arranged diagonally opposite with respect to each other belong to first respectively second group. Such design again enables the coupling of an elongated electrical device, such as a lamp, in different orientations.

In an embodiment of a counter connector arrangement, the number of counter connector elements belonging to the first group and the number of counter connector elements belonging to the second group is one in each case. In such embodiment, the number of electrical counter connector elements is two. Such an embodiment may be installed for example on a ceiling of any room in a shell construction as basic equipment to allow a flexible and easy mounting of an electrical device.

That is, the electrical counter connector arrangement includes a two electrical counter connector elements in a side-by-side arrangement, the two electrical counter connector elements being a first and a second electrical counter connector element. The first main counter connector element contact of the first electrical counter connector element and the second main counter connector element contact of the second electrical counter connector element are electrically unconnected respectively isolated with respect to each other.

For a matrix arrangement as described before, this type of embodiment may be considered as a particular design were the number of rows is one and the number of columns is two, or vice versa.

In an embodiment of an electrical counter connector element or electrical counter connector arrangement, a touch protection member is present for some or each electrical counter connector element. The touch protection member divides the receiving room of an electrical counter connector element into a central compartment and a peripheral compartment, with the counter connector element axis extending through the central compartment. The main counter connector element contact is arranged in the peripheral compartment. The central compartment and the peripheral compartment are connected via contact access windows in the form of through-going aperture of the touch protection members. Further aspects of such design are discussed below in the context of exemplary embodiments.

In an embodiment of an electrical counter connector arrangement, the main counter connector element contacts of counter connector elements belonging to the first group of counter connector elements are in each case electrically connected to a phase conductor of a mains connection power and the main counter connector element contacts of counter connector elements belonging to the second group of counter connector elements are electrically connected to a neutral conductor of the mains connection. In such an embodiment, the first or the second main connector element contact of an electrical connector may be connected to one of the first or second group belonging main counter connector element contact. The mains connection may in particular provide line voltage, for example 110V AC or 230V AC.

Such arrangement may provide a matrix of electrical counter connector elements that may be used, in combination with corresponding electrical connectors, in substantially the same manner for mounting one or more electrical devices as conventional sockets, but with particularly high flexibility and variability regarding the number of electrical devices as well as their position and orientation.

It is noted that more than one electrical connector respectively electrical device may be coupled with the counter connector arrangement at different positions. In this way, a number of electrical devices, for example lamps, may be arranged at different positions. Further, individual electrical devices may be simply added or removed as desired.

In another embodiment, the main counter connector element contacts of counter connector elements belonging to the first group of counter connector elements are electrically connected to a positive pole of a DC power supply and the main counter connector element contacts of counter connector elements belonging to the second group of counter connector elements are electrically connected to a negative pole of a DC power supply. The DC power supply may, for example, be a mains adapter including components such as one or more transformer(s), rectifier(s) and general circuitry as known in the art.

In a further aspect, the overall objective is achieved by a connector element-counter connector element arrangement. The connector element-counter connector element arrangement includes an electrical connector element and an electrical counter connector element to any embodiment as disclosed above and further below.

Furthermore, the overall objective is achieved by a connector-counter connector arrangement design. The connector-counter connector arrangement design includes an electrical connector and an electrical counter connector arrangement to any embodiment as disclosed above and further below.

Further disclosed are electrical connectors and electrical counter connector arrangements as follows:

An electrical connector, in particular the plug includes a first, a second and a third electrical connector element. The biasing member which is connected to the first, second and third connector element body, biases the insertion parts of the three connector elements towards each other or away from each other, depending if the connector element engagement directions of the three connector elements pointing towards each other or away from each other, respectively.

A corresponding electrical counter connector arrangement may include a number of electrical counter connector elements with an in each case hexagonal or circular contour of the receiving aperture. The electrical counter connector elements are arranged in a side-by-side arrangement as groups of three. The distance between the hexagon side of the adjacent electrical counter connector element is equal. The electrical counter connector elements are divided into a first group of counter connector elements, a second group of counter connector elements and a third group of counter connector elements. All main counter connector element contacts belonging counter connector elements of same group are electrically connected among each other, but not to the main counter connector element contacts of the other counter connector element groups. Three counter connector elements, each belonging to one of the three groups, are arranged in a group with each other so that one corner of each of the hexagonal receiving apertures faces each other. The counter connector elements are generally designed in the same manner as in other designs as discussed before.

The number of the counter connector elements of each group is equal. Such an embodiment may be used for electrical loads using three-phase current e.g. at a line voltage of 400 V. For the electrical and mechanical connection in such an embodiment, an electrical connector containing three electrical connector elements may be used.

In a specific embodiment, the main counter connector element contacts belonging to a first, second and third group are connected to the three phases of a three-phase mains power supply as known in the art.

DESCRIPTION OF THE EMBODIMENTS

Figure 1:
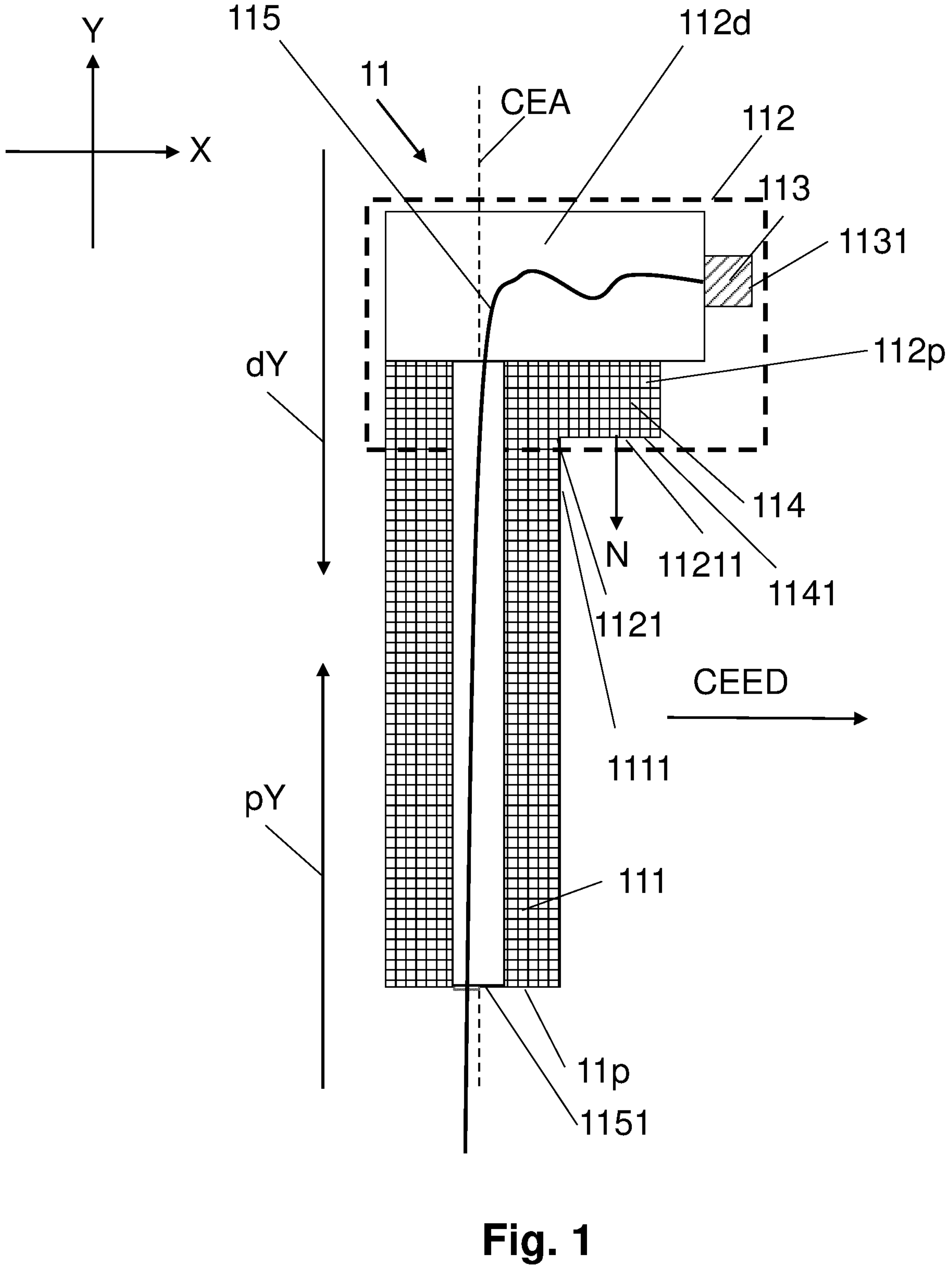
FIG. 1 shows a schematic sectional side view of an electrical connector element according to an embodiment of the invention.

FIG. 1 shows an embodiment of an electrical connector element 11 in a schematic sectional view, with the sectional plane corresponding to the X-Y-plane. The electrical connector element 11 includes a connector element body 111 which may in this embodiment be made from a non-conductive plastic material, for example polycarbonate and may have for example a rectangular cross section. The connector element body 111 extends along the connector element axis CEA trough the connector element body 111. For illustrative purposes, a coordinate system is further shown with the Y-Axis being parallel to the connector element axis CEA. A proximal connector element direction pY exemplarily point in the positive Y-direction and a distal element direction dY points in the negative Y-direction. Furthermore, the electrical connector element 11 includes an insertion part 112 which is distally adjacent to the connector element body 111.

The insertion part 112 has an exemplarily rectangular cross section and may be made from generally the same type of material as the connector element body 111. In this embodiment, the connector element body 111 and the insertion part 112 may be formed integrally or as separate parts and mounted to each other. At the transition from the connector element body 111 to the insertion part 112, an engagement step 1121 with an engagement step surface 11211 is formed. The engagement step surface 11211 extends outwards with respect to the connector element axis CEA. Exemplarily, the connector element engagement direction CEED corresponds to the positive X-direction. A normal direction N of the engagement step surface 11211 points proximally. The engagement step 1121 is formed, in combination, by the engagement step surface 11211 and an adjacent surface element 1111 of the surface, in particular shell surface, of the connector element body 111.

In the shown example, a proximal portion 112*p* of the insertion part is formed integrally with the connector element body 111, while a distal portion 112*d* of the insertion part 112 is a separate element that is mounted to the proximal part 112*p*. Other designs, however, may be used as well.

Furthermore, a main connector element contact 113 is arranged at the insertion part 112 and is exemplarily carried by its distal portion 112*d*. The main connector element contact 113 has a main connector element contact surface 1131 with a normal direction pointing in the connector element engagement direction CEED. The main connector element contact surface 1131 is made from a conductive metal as generally known for electrical contacts, such as copper, and may further be plated to decrease the transition contact and prevent corrosion, as generally known. In the shown example, the main connector element contact surface 1131 is planar. In an operational configuration, the electrical connector element 11 is coupled with an electrical counter connector element 21 as discussed further below with reference to FIG. 2, and the main connector element contact surface 1131 and a main counter connector element contact surface 2131 of the electrical counter connector element 21 are frontally contacted and establish the electrical contact.

In a variant, the electrical connector element 11 further contains an auxiliary connector element contact. For this purpose, at least the proximal portion 112*p* of the insertion part 112 and optionally the connector element body 111 are made from metallic respectively conductive material or coated with such material. Here, the proximal part 112*p* of the insertion part 112 or a part thereof forms, at the same time an auxiliary connector element contact 114 and the engagement step surface 11211 serves as the same time as auxiliary connector element contact surface 1141. The auxiliary connector element contact 114 may for example be used for grounding purposes or for data transmission e.g. to control illumination via smart home system. Similar to the main connector element contact surface 1131, the auxiliary connector element contact surface 1141 may be frontally contacted with the auxiliary counter connector element contact surface 2141 as explained further below in this design.

In a further variant, the auxiliary connector element contact 114 is provided as a dedicated element that is arranged on or into the proximal portion 112*d* of the insertion part 112, with the auxiliary connector element contact surface 1141 being arranged on or integrated into the engagement step surface 11211.

In further variants, further separate auxiliary connector element contacts may be provided in the same manner and/or one or more auxiliary connector element contacts may be provided at other locations respectively locations of the insertion part 112.

A main connector element coupling conductor which exemplarily realized as a main connector element coupling wire 115, typically an insulated optionally a cord or litz wire, is electrically connected to the main connector element contact 113 within the electrical connector element 11. The main connector element coupling wire 151 is guided in a hollow channel or room inside the connector element body 111 and exits the connector element body 111 at a conductor aperture 1151 at the proximal connector element end 11*p*. For optional auxiliary connector element contacts, coupling conductors may be present in the same manner. The main connector element coupling conductor 115 and optional auxiliary connector element coupling conductors, e. g. auxiliary connector element coupling wires, may be combined in a multi-pole cable if appropriate. Optional strain relief and/or anti-kink elements may be foreseen as generally known in the art if appropriate.

Figure 2:
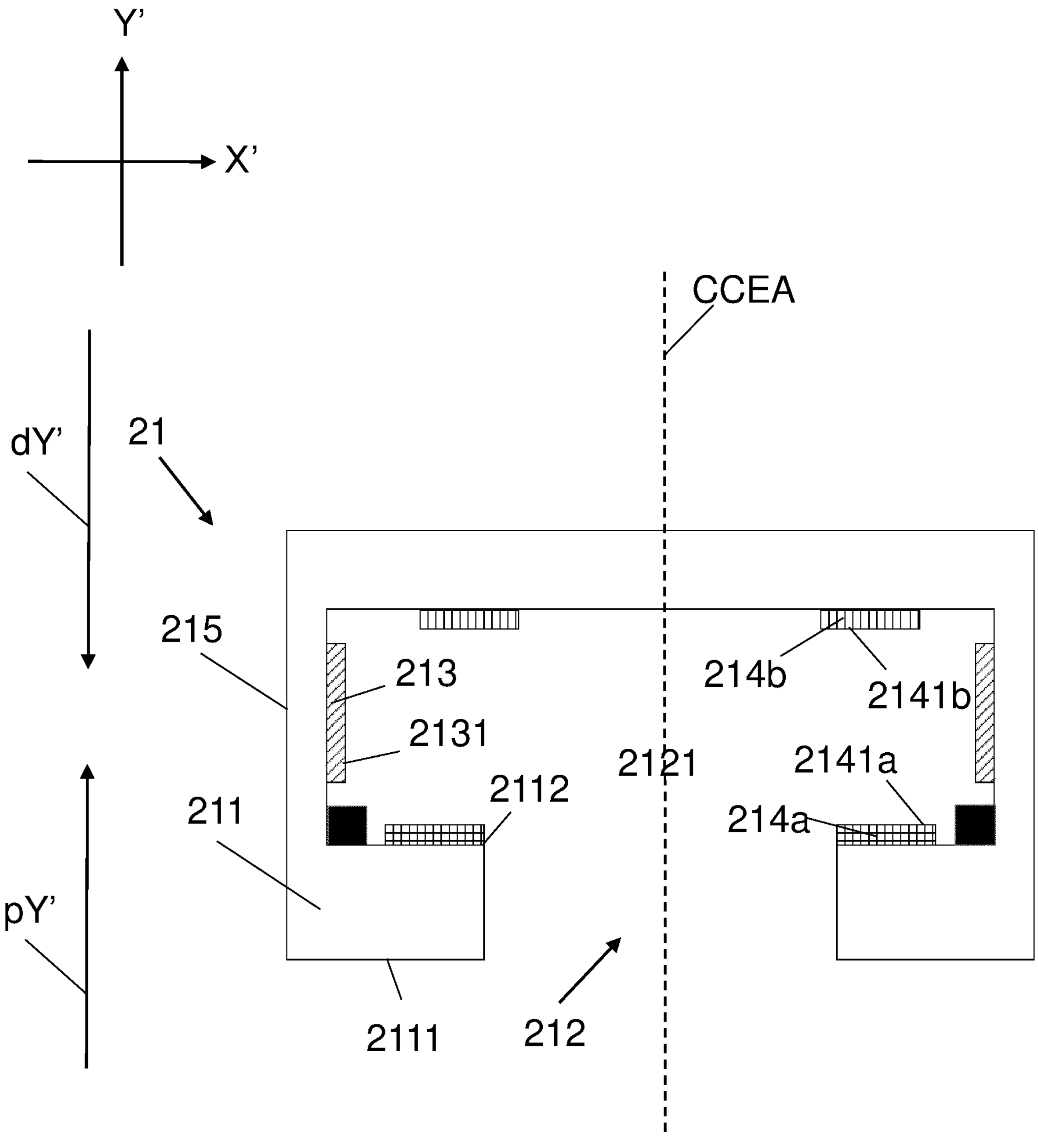
FIG. 2 shows a schematic sectional view of an electrical counter connector element according to an embodiment of the invention.

FIG. 2 shows an embodiment of an electrical counter connector element 21 in a schematic sectional view, with the sectional plane corresponding to the X'-Y'-plane. The electrical counter connector element 21 includes the counter connector element front member 211 with the proximal front member side 2111 and the distal front member side 2112 and may in this embodiment be made from a non-conductive plastic material, for example polycarbonate. Furthermore, the electrical counter connector element 21 includes the receiving aperture 212 which extends continuously along the counter connector element axis CCEA between the proximal 2111 and distal 2112 front member side. For illustrative purposes, a coordinate system is further shown with the Y'-Axis being parallel to the counter connector element axis CCEA. A proximal counter contact element direction pY' exemplarily point in the positive Y'-direction and a distal counter connector element direction dY' points in the negative Y'-direction.

The receiving room 2121 is rectangular and being rotationally symmetric of order four, but also can be different in another embodiment. The receiving aperture 212 opens into the receiving room 2121 distal from the counter connector element front member 211. The receiving room 2121 is configured to receive the insertion part 112 via the receiving aperture 212 to connect and mechanically attach the electrical connector element 11 with the electrical counter connector element 21.

Furthermore, the main counter connector element contact 213 is distally arranged at the counter connector element front member 211. The main counter connector element contact 213 has a main counter connector element contact surface 2131 with a normal direction pointing in the connector element engagement direction CEED as discussed further above with reference to FIG. 1. The main counter connector element contact surface 2131 is laterally set back with respect to the receiving aperture 212 and laterally delimit the receiving room 2121. The main counter connector element contact surface 2131 may be made from the same conductive metal like the main connector element contact surface 1131 described further above with reference to FIG. 1. In the shown example, the main counter connector element contact surface 2131 is planar. The main counter connector element contact surface 2131 may be arranged circumferentially continuous with respect to the receiving aperture 212, but in another embodiment, may also be arranged circumferentially in a number of main counter connector element contact surface segments.

In a variant, the main counter connector element contact 213 is arranged on the counter connector element contact carrier 215. In this embodiment, the counter connector element contact carrier 215 is shown integrally formed with the distal front member side 2112 and project in distal direction from the distal front member side 2112.

In a variant, the electrical counter connector element 21 further contains additional auxiliary counter connector element contacts 214*a*, 214*b* which are arranged adjacent to the main counter connector element contact 213. The auxiliary counter connector element contacts 214*a*, 214*b* each have a respective auxiliary counter connector element contact surface 2141*a*, 2141*b* which may be planar and may be made from the same conductive material like the auxiliary connector element contact surface 1141. While coupling, the auxiliary counter connector element contacts 214*a*, 214*b* acts as the counterpart to the auxiliary connector element contact 114, and the auxiliary counter connector element contact surfaces 2141*a*, 2141*b* may be frontally contacted with the auxiliary connector element contact surface 1141.

While not explicitly shown, an electrical conductor, such as a wire, may be provided to connect the main counter connector element contact 213 and the optional one or more auxiliary counter connector element contacts 214*a*, 214*b*.

Figure 3:
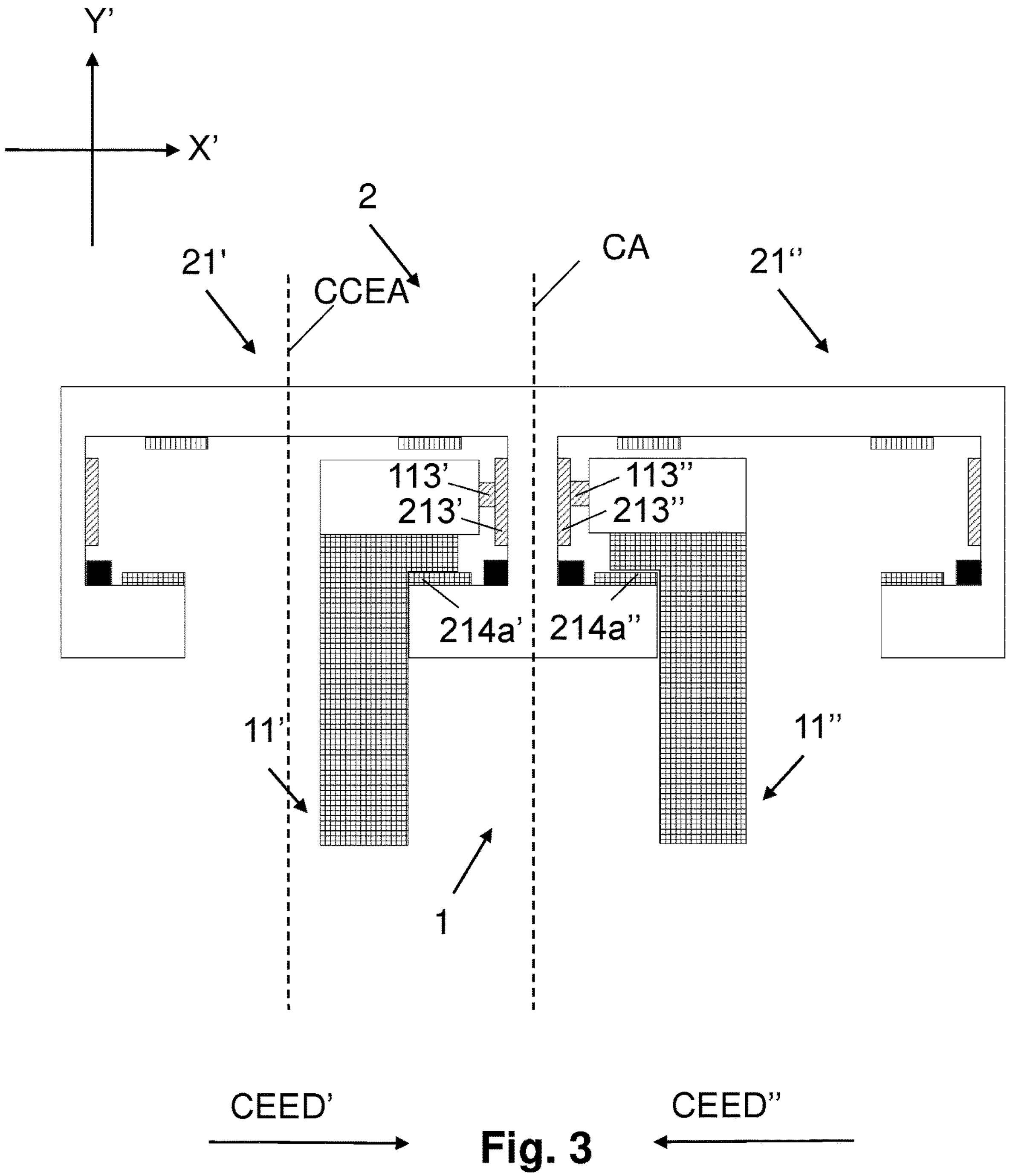
FIG. 3 shows a schematic sectional view of an electrical connector coupled with an electrical counter connector according to an embodiment of the invention.

FIG. 3 shows an embodiment of the electrical connector 1 coupled with the electrical counter connector arrangement 2 in a view analogue to FIG. 2. In the shown embodiment, the electrical counter connector element 21' of the electrical counter connector arrangement 2 belongs to a first group of counter connector elements and the electrical counter connector element 21" of the electrical counter connector arrangement 2 belongs to a second group of the counter connector elements as explained before. In this embodiment, the connection axis CA represents the symmetry axis and therefore the electrical counter connector element 21' is laterally reversed to the electrical counter connector element 21". The main counter connector element contacts 231' of the first group of counter connector elements 21' may are electrically connected to a phase conductor of a mains connection power and the main counter connector element contacts 231" of the second group of counter connector elements 21" may are electrically connected to a neutral conductor of the mains connection. In a further embodiment, the main counter connector element contacts 213' of the first group of counter connector elements 21' may be electrically connected to a neutral conductor of the mains connection and the main counter connector element contacts 213" of the second group of counter connector elements 21" may are electrically connected to a phase conductor of a mains connection power.

In the embodiment shown in FIG. 3, the first 11' and second 11" electrical connector element of the electrical connector 1 point towards each other. The first 11' and second 11" electrical connector element may be of identical shape, dimension and design, but may also be different in another embodiment.

When coupling the main connector element contact 113' of the first electrical connector element 11' with the main counter connector element contact 213' belonging to the first group and coupling the main connector element contact 113" of the second electrical connector element 11" with the main counter connector element contact 213" belonging to the second group, an electrical connection and a simultaneous mechanical coupling is established. Furthermore, in the coupled state, the biasing member described further below with reference to FIG. 4 and FIG. 5 additionally supports the mechanical mounting by its biasing force.

Furthermore, in this embodiment, when coupling the electrical connector 1 with the electrical counter connector arrangement 2, the auxiliary connector element contact 114' of the first electrical connector element 11' is frontally connected with the auxiliary counter connector element contact 214*a*' of the of the first group of counter connector elements 21', and the auxiliary connector element contact 114" of the second electrical connector element 11" is frontally connected with the auxiliary counter connector element contact 214*a*" of the second group of counter connector elements 21", as shown in FIG. 3. Through the coupling, the auxiliary connection for example for data transmission or as a grounding connection for safety reason is simultaneously established with the coupling of the main contact elements.

It is noted that in FIG. 3 as well as the following figures, the main connector element coupling wire as well as the room in which it is guided inside the connector element body as well as the coupling wire aperture are not shown for clarity reasons, but are typically present.

Figure 4:
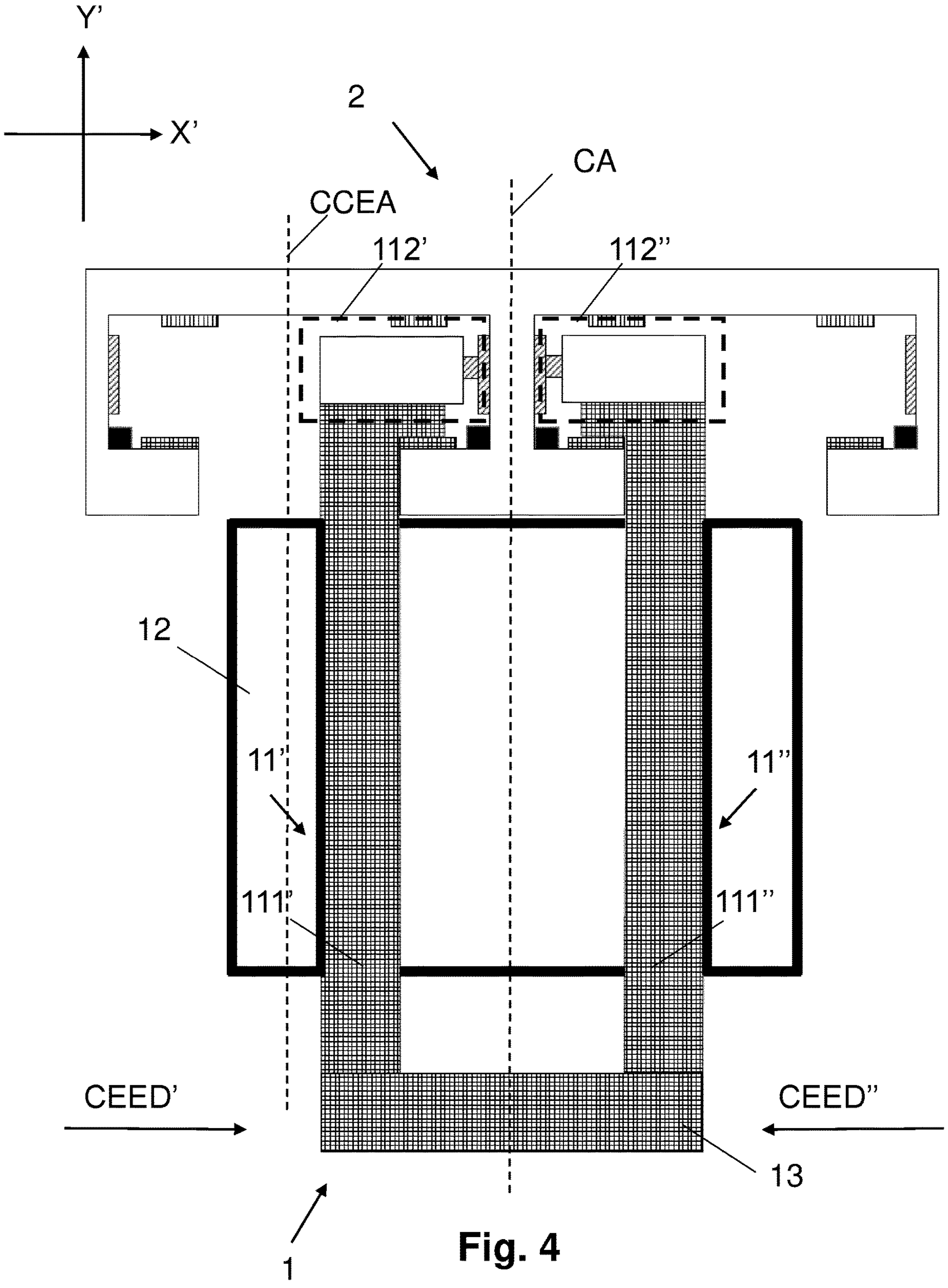
FIG. 4 shows a schematic sectional view of an electrical connector coupled with an electrical counter connector according to further embodiment of the invention.

FIG. 4 shows a further embodiment of the electrical connector 1 coupled with the electrical counter connector arrangement 2 in a view analogue to FIG. 3 with the counter connector element axis being aligned to the Y' direction as shown in FIG. 3. In this embodiment, the first 11' and the second 11" electrical connector element are formed integrally.

Furthermore, in the shown example, the biasing member 12, here shown as a resilient tubular element, biases the first insertion part 112' of the first electrical connector element 11' and the second insertion part 112" of the second electrical connector element 11" towards each other. Further in this embodiment, the first 11' and second 11" electrical connector element are connected to and project from a base element 13. The connector element bodies of the first 11' and second 11" electrical connector element are favorably flexibly, e.g. elastically connected to the base element 13.

Figure 5:
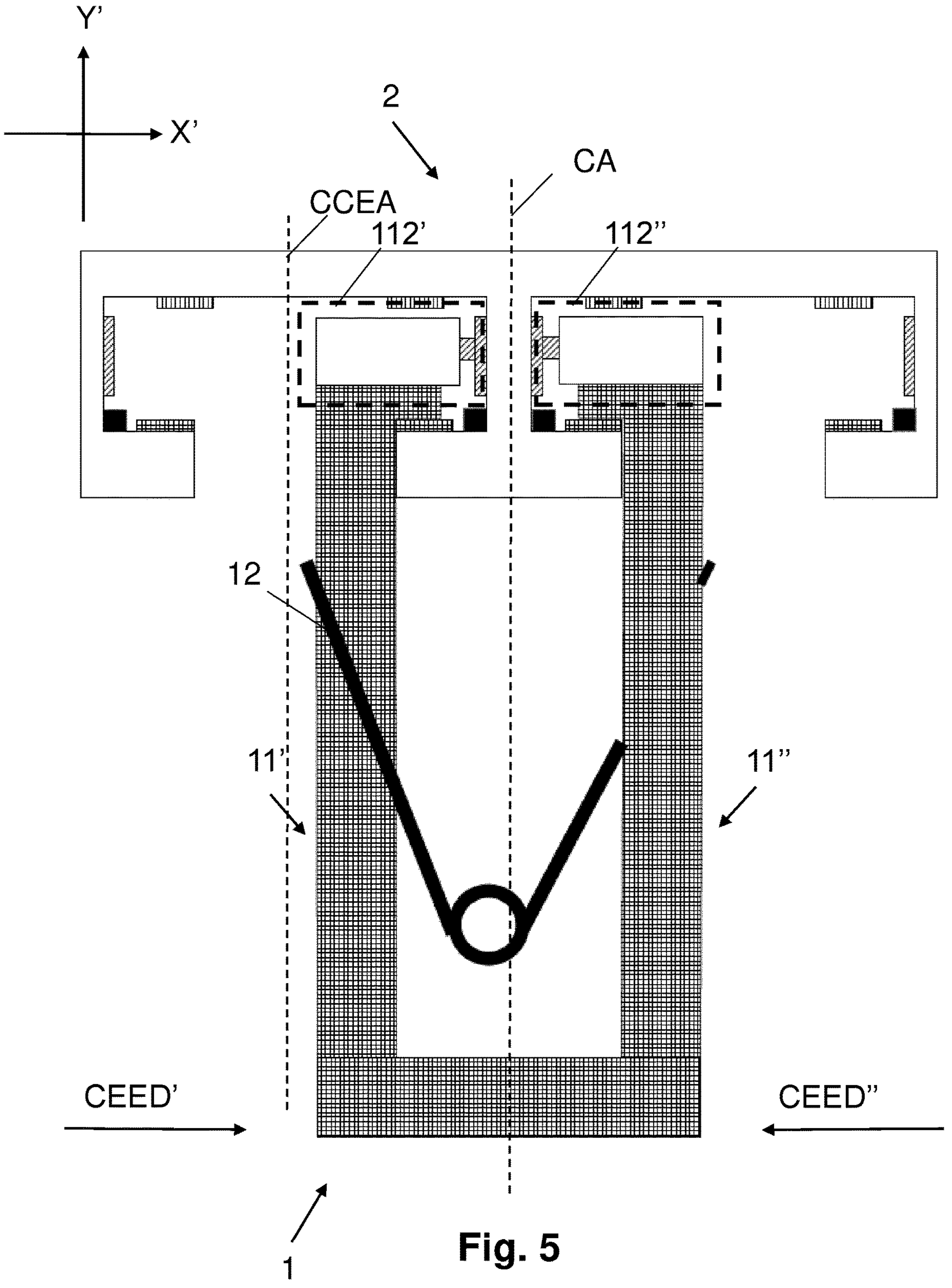
FIG. 5 shows a schematic sectional view of an electrical connector coupled with an electrical counter connector according to further embodiment of the invention.

FIG. 5 shows a further embodiment of the electrical connector 1 coupled with the electrical counter connector arrangement 2 generally similar to FIG. 4. In this embodiment, the first 11' and the second 11" electrical connector element are formed integrally with each other and the base element 13.

Furthermore, in the shown example, the biasing member 12 is a spring, biasing the first insertion part 112' of the first electrical connector element 11' and the second insertion part 112" of the second electrical connector element 11" towards each other. The biasing member 12 may, for example be made from spring steel wire and may be a leg spring respectively torsion spring.

Figure 6:
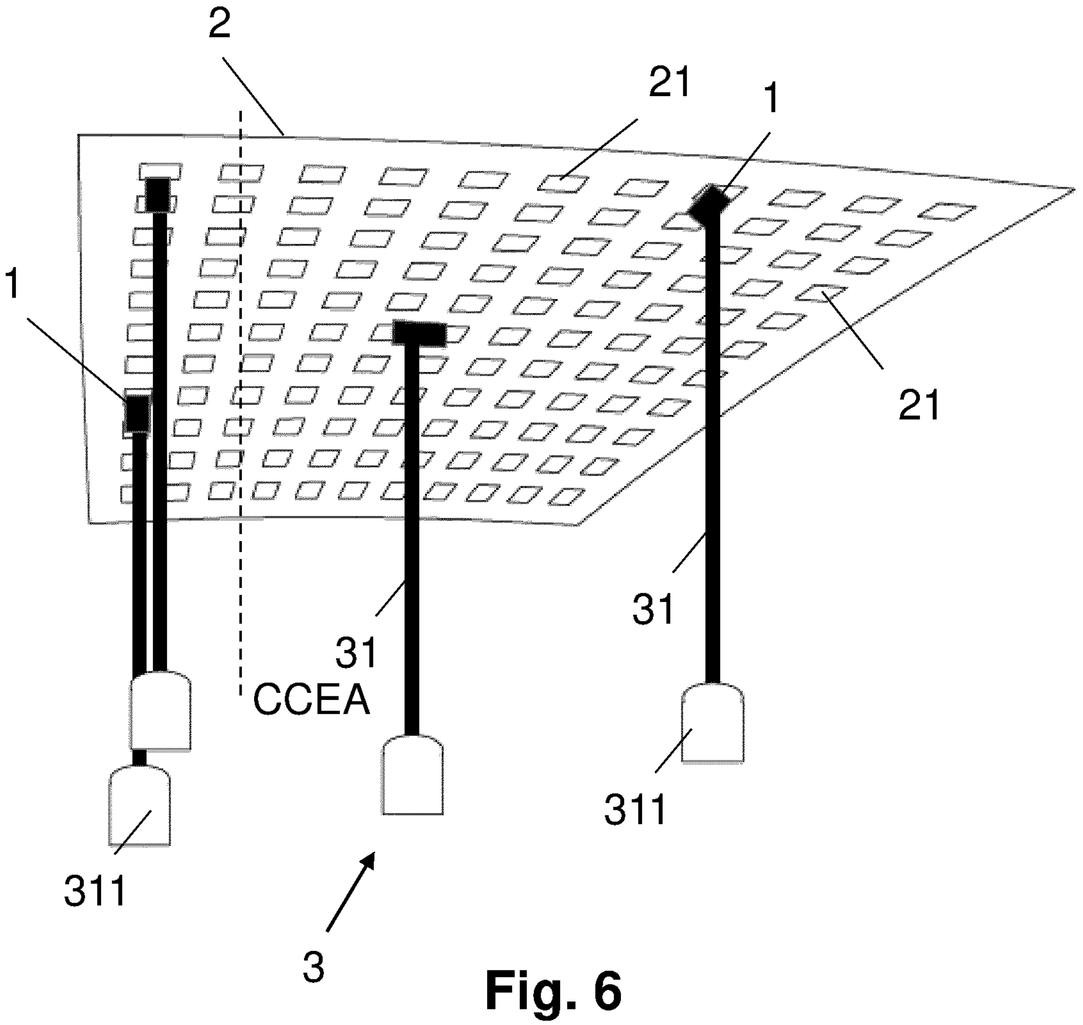
FIG. 6 shows a schematic view of an electrical counter connector arrangement coupled with electrical devices according to an embodiment of the invention.

FIG. 6 shows a schematic view of an electrical counter connector arrangement 2 containing a number of electrical devices 3. In this embodiment, each of the electrical device 3 includes the electrical connector 1 and the electrical powered load 31 which may contain the lighting element 311. The electrical devices 3 in this embodiment are mounted in different spatially oriented directions.

Figure 7:
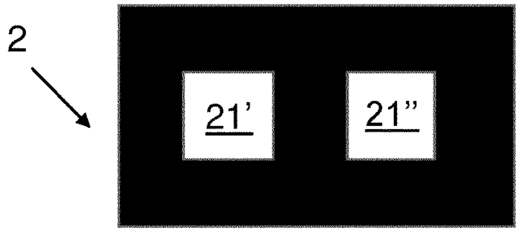
FIG. 7 shows a schematic top view of an electrical counter connector arrangement according to the invention.

FIG. 7 shows an electrical counter connector arrangement 2 containing two electrical counter connector elements 21', 21" in a schematic top view respectively view onto the receiving apertures. This is the view that is typically visible if a counter connector arrangement 2 is mounted in a cutout of a cabinet, mounted on a wall or ceiling or the like. In the shown design, the contour of the receiving apertures of the electrical counter connector elements 21' and 21" is in each case square.

It is noted that two is generally the smallest number of counter connector elements in a counter connector arrangement 2. This embodiment shows exemplarily square contours of the receiving apertures of each counter connector element 21' and 21" and the electrical counter connector element 21' of the electrical counter connector arrangement 2 belongs to the first group of counter connector elements and the electrical counter connector element 21" of the electrical counter connector arrangement 2 belongs to the second group of the counter connector elements. Such design is suited for AC application as well as DC applications if polarity is irrelevant and allows the mounting of one electrical device.

Figure 8:
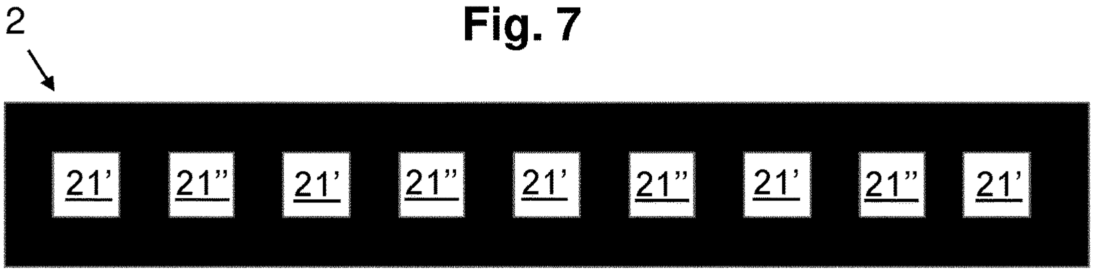
FIG. 8 shows a schematic top view of further embodiment of an electrical counter connector arrangement according to the invention.

FIG. 8 shows an electrical counter connector arrangement 2 similar to FIG. 7, but with a larger number of electrical counter connector elements 21', 21", all of which are arranged in a single row. The distance between each adjacent electrical counter connector element 21' and 21" is equal. Furthermore, the electrical counter connector element 21' of the electrical counter connector arrangement 2 belongs to the first group of counter connector elements and the electrical counter connector element 21" of the electrical counter connector arrangement 2 belongs to the second group of the counter connector elements.

Figure 9:
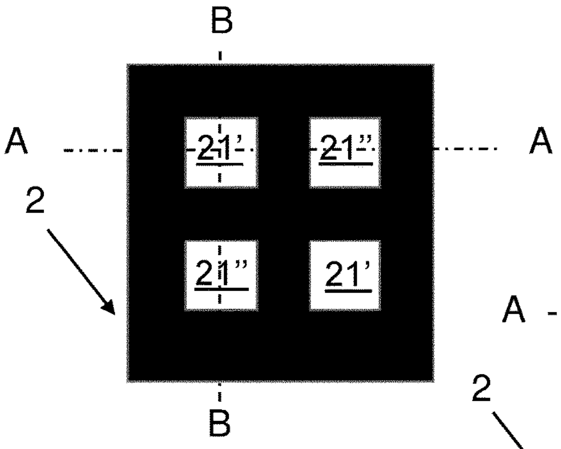
FIG. 9 shows a schematic top view of further embodiment of an electrical counter connector arrangement according to the invention.

FIG. 9 shows a further embodiment of an electrical counter connector arrangement 2 similar to FIG. 7. In this design, the electrical counter connector elements 21' and 21" arranged in a 2-by-2 matrix. The rows A and columns B are equally distributed and the distance between the adjacent electrical counter connector elements 21 is equal.

Figure 10:
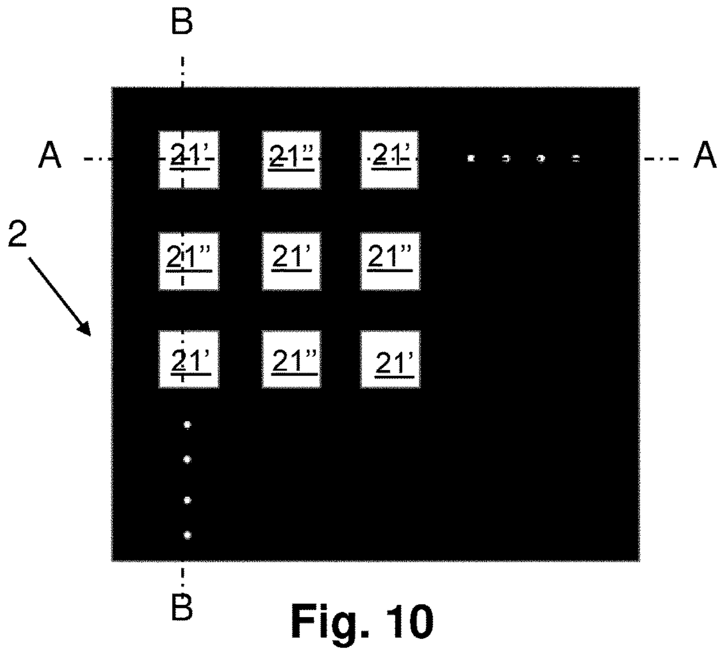
FIG. 10 shows a schematic top view of further embodiment of an electrical counter connector arrangement according to the invention.

FIG. 10 shows a further embodiment of an electrical counter connector arrangement 2 similar to FIG. 9, but with exemplarily three rows A and columns B. It is noted that the number of rows and columns may generally be chosen as desired.

Figure 11:
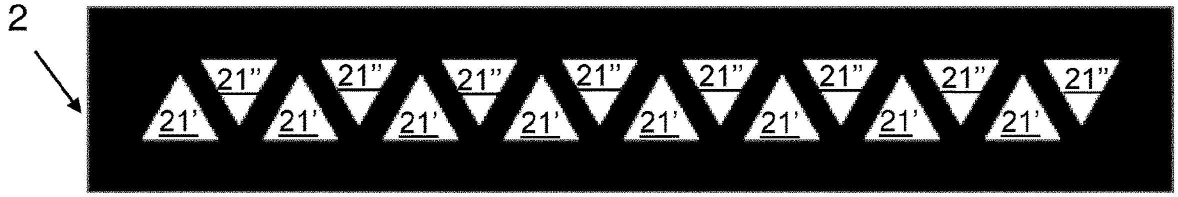
FIG. 11 shows a schematic top view of further embodiment of an electrical counter connector arrangement according to the invention.

FIG. 11 shows a further embodiment of an electrical counter connector arrangement 2 generally similar to FIG. 8. In this embodiment, however, the contours of the receiving apertures of the electrical counter connector elements 21' and 21" are triangular: Like in the embodiment of FIG. 8, the distance between each adjacent electrical counter connector element 21' and 21" is equal. It is noted that the orientation of all receiving apertures of all electrical counter connector elements 21' (i.e. every second electrical counter connector element) is identical and further the orientation of all receiving apertures of all electrical counter connector elements 21" is identical, but mirrored with respect to the receiving apertures of the electrical counter connector elements 21' abut an axis along which the counter connector elements are arranged. Along this axis, electrical counter connector elements 21' and electrical counter connector elements 21" alternate with each other.

Figure 12:
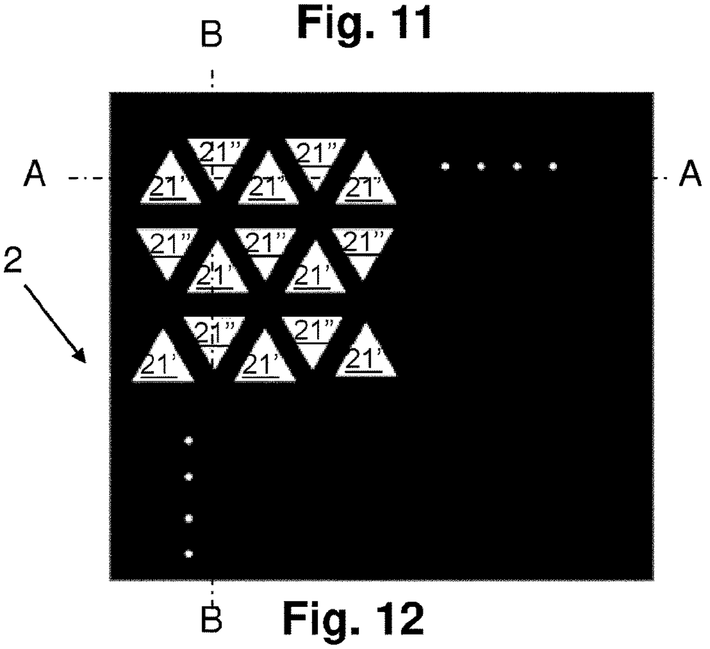
FIG. 12 shows a schematic top view of further embodiment of an electrical counter connector arrangement according to the invention.

FIG. 12 shows a further embodiment of an electrical counter connector arrangement 2 similar to FIG. 10 but with the counter connector elements respectively their receiving apertures being designed as shown in FIG. 11. It can be seen that counter connector elements 21' respectively 21" alternate with other within each row A and within each column B.

Figure 15:
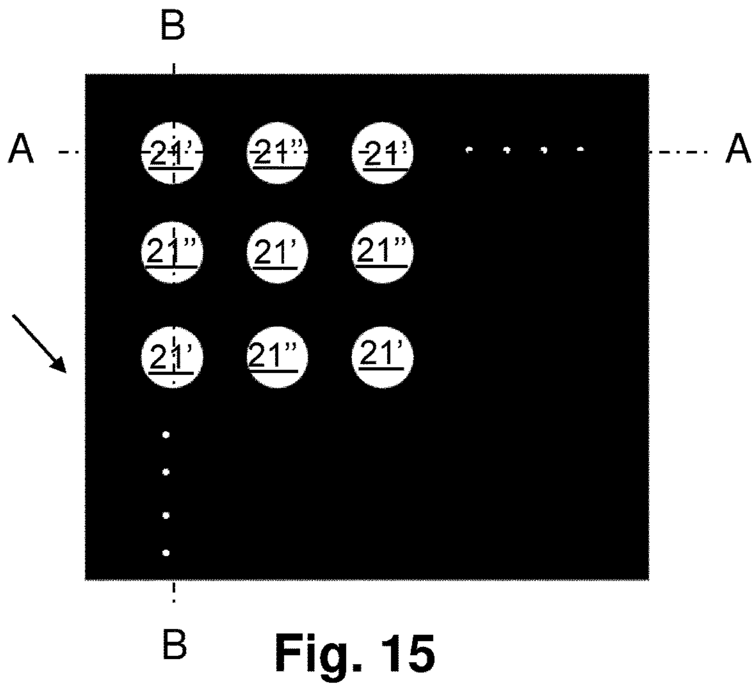
FIG. 15 shows a schematic top view of further embodiment of an electrical counter connector arrangement according to the invention.

FIG. 15 shows a further embodiment of an electrical counter connector arrangement 2 similar to FIG. 10 but with the counter connector elements respectively their receiving apertures having a circular contour. For such design of the counter connector elements, the connector element body, in particular its distal part that is adjacent to the insertion part and forms, together with the engagement step surface the engagement step, is favorably shaped as cylinder section to allow smooth engagement with the counter connector element front member.

Figure 13:
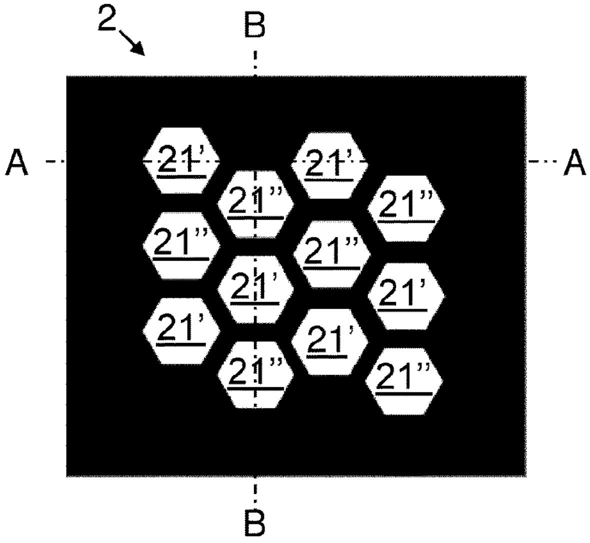
FIG. 13 shows a schematic top view of further embodiment of an electrical counter connector arrangement according to the invention.

FIG. 13 shows an embodiment of an electrical counter connector arrangement 2 in a schematic top view containing electrical counter connector elements 21' and 21" arranged in a side-by-side matrix. The rows A and columns C are equally distributed and the distance between the adjacent electrical counter connector elements is equal. The contour of the receiving aperture of each counter connector element 21' and 21" is hexagonal and the electrical counter connector elements are connected to for a first and second group of counter connector elements as discussed before.

Figure 14:
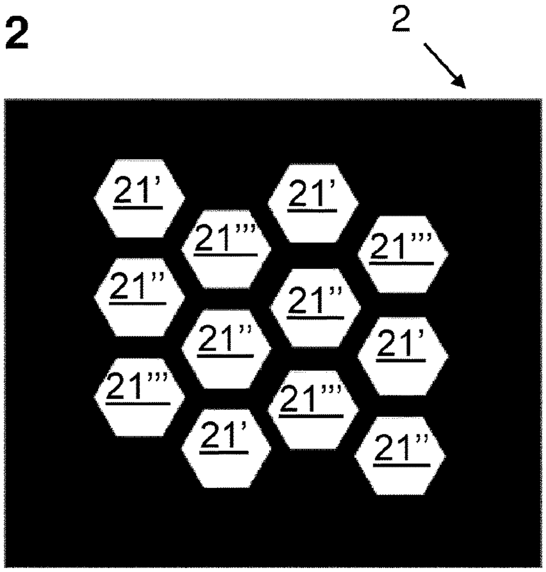
FIG. 14 shows a schematic top view of further embodiment of an electrical counter connector arrangement according to the invention.

FIG. 14 shows a further an embodiment of an electrical counter connector arrangement 2 in a schematic top view containing electrical counter connector elements 21', 21" and 21'". The contour of the receiving aperture of each counter connector element 21', 21" and 21'" is hexagonal and distance between the adjacent hexagon side of the electrical counter connector elements is equal. The electrical counter connector elements are divided into a first group of counter connector elements 21', a second group of counter connector elements 21" and a third group of counter connector elements 21'". Such a specific embodiment may be used for electrical loads using three-phase current, e.g. at a line voltage of 400 V.

Figure 16:
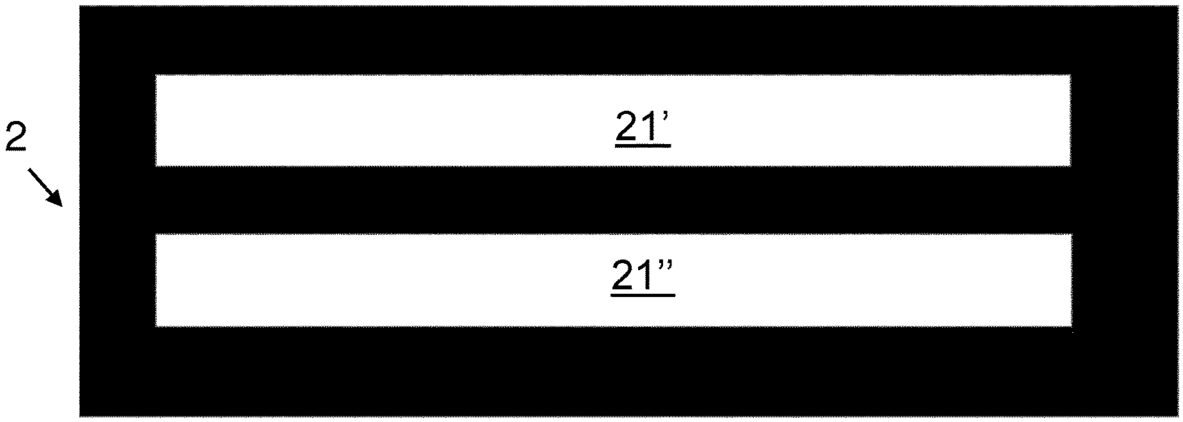
FIG. 16 shows a schematic top view of further embodiment of an electrical counter connector arrangement according to the invention.

FIG. 16 shows a schematic top view of further embodiment of an electrical counter connector arrangement similar to FIG. 7 in that two counter connector elements 21', 21" are present. In the embodiment of FIG. 16, however, the counter connector elements 21', 21" are elongated and extend parallel to each other. The shown arrangement may be extended to include generally any desired number of electrical counter connector elements belonging to a first respectively second group, by replicating the shown arrangement as desired with counter connector elements 21' belonging to the first group alternating with counter connector elements 21" belonging to the second group. In AC applications or DC applications where polarity is irrelevant, all electrical counter connector elements may and typically are arranged equidistantly, such than an electrical connector may be with any two neighboring counter connector elements. In DC applications where polarity matters, in contrast, a larger distance is favorably present between each pair of a counter connector element belonging to the first and second group.

Figure 17:
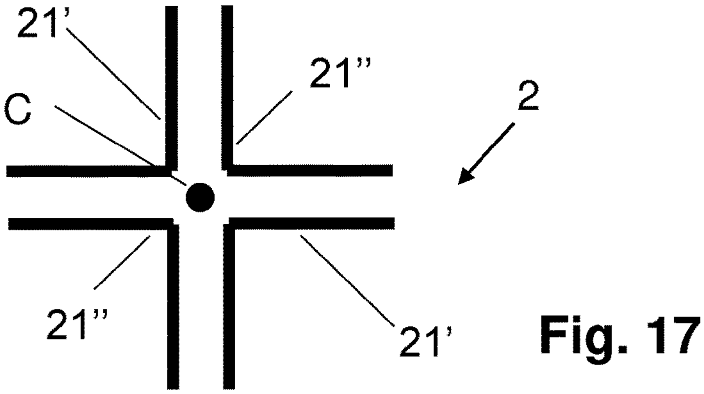
FIG. 17 shows a schematic top view of further embodiment of an electrical counter connector arrangement according to the invention.

FIG. 17 shows a schematic top view of a further counter connector arrangement. In this embodiment, the counter connector elements 21', 21" have an in each case L-shaped contour of the receiving aperture. The counter connector elements 21, 21" are arranged in a centrally symmetrical manner with respect to center C. The two in each case diametrically opposite counter connector elements 21' respectively counter connector elements 21" form the first respectively second group of counter connector elements. The arrangement is such that in each case parallel legs are equidistant, thereby allowing the coupling with an electrical connector as explained before. The shown structure may, of course, be replicated as desired.

Like in the design as shown in FIG. 16, the main counter connector element contacts favorably extend over substantially the whole length of the legs respectively apertures, thereby allowing coupling of an electrical connector at any desired position.

In the following, reference is additionally made to FIGS. 18, 19, 20, 21, 22, 23, 24, 25, 26, 27, and 28, showing a further exemplary embodiment of an electrical connector 1 and an electrical counter connector arrangement 2 and parts thereof in various views and configurations. The general arrangement of the electrical counter connector arrangement 2 corresponds generally to FIG. 9 and FIG. 10 with an arrangement of rows and columns as discussed above.

In the shown design, the electrical connector 1 and electrical counter connector arrangement 2 may be used, e.g., for lighting elements, such as lamps, and may be designed for a line voltage of, e.g., 110 VAC and/or 230 VAC with grounding. In this specific configuration, one of the first electrical connector elements 11' and second electrical connector element 11" of the electrical connector 1 serves for connecting the phase and the other the neutral conductor. The same applies for the first group counter connector elements 21' respectively second group counter connector elements 21" of the electrical counter connector arrangement 2. Different designs and applications are possible.

Figure 18:
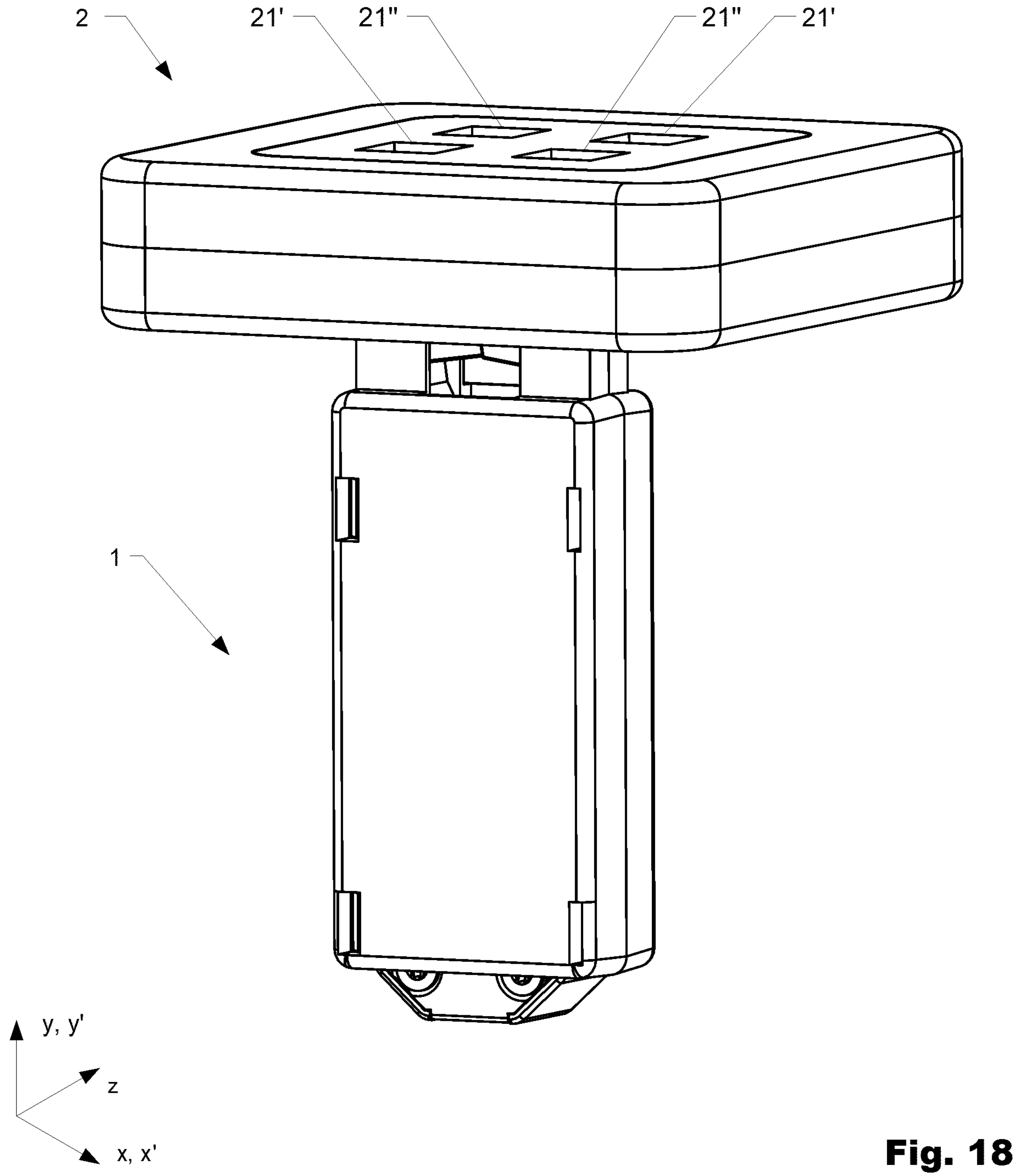
FIG. 18 shows a further embodiment of an electrical connector and a further embodiment of an electrical counter connector arrangement according to the invention in a perspective view.

FIG. 18 shows the electrical connector 1 and electrical counter connector arrangement 2 in a perspective view with in an intermediate state during coupling, with the insertion parts being placed in their respective receiving rooms, but prior to engagement. The orientation corresponds to, e.g. FIG. 6, with the direction of gravity corresponding to the −y respectively −y'-direction.

Figure 19:
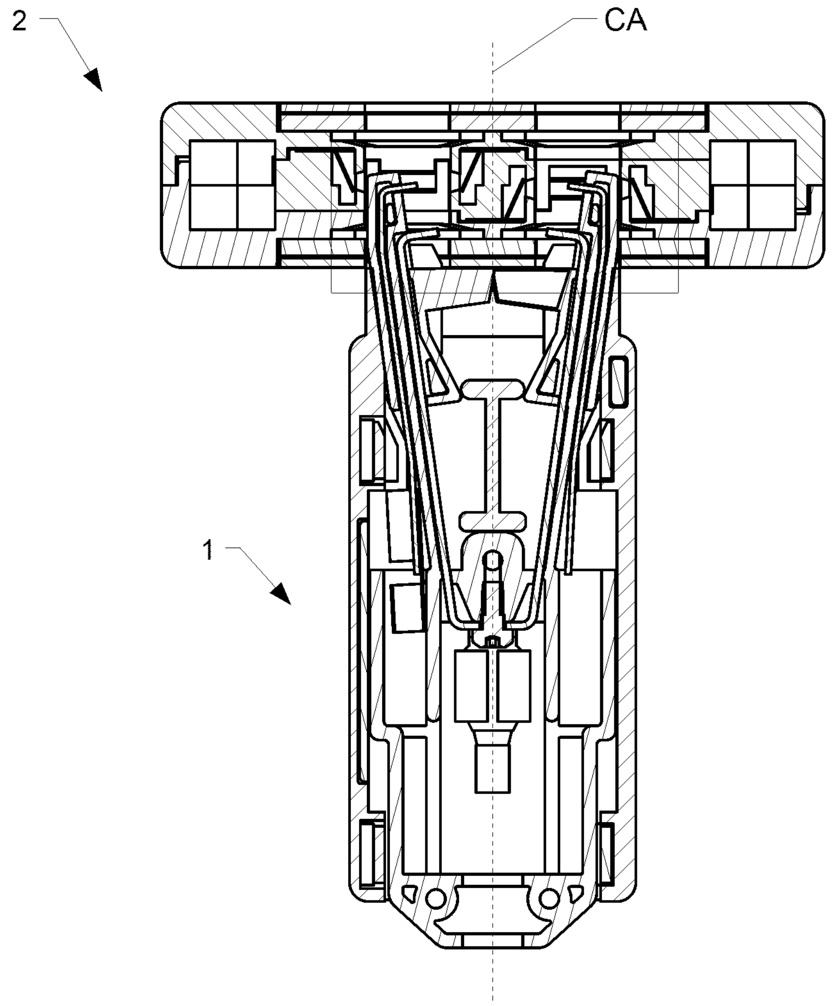
FIG. 19 shows the arrangement according to FIG. 18 in a sectional view.
Figure 20:
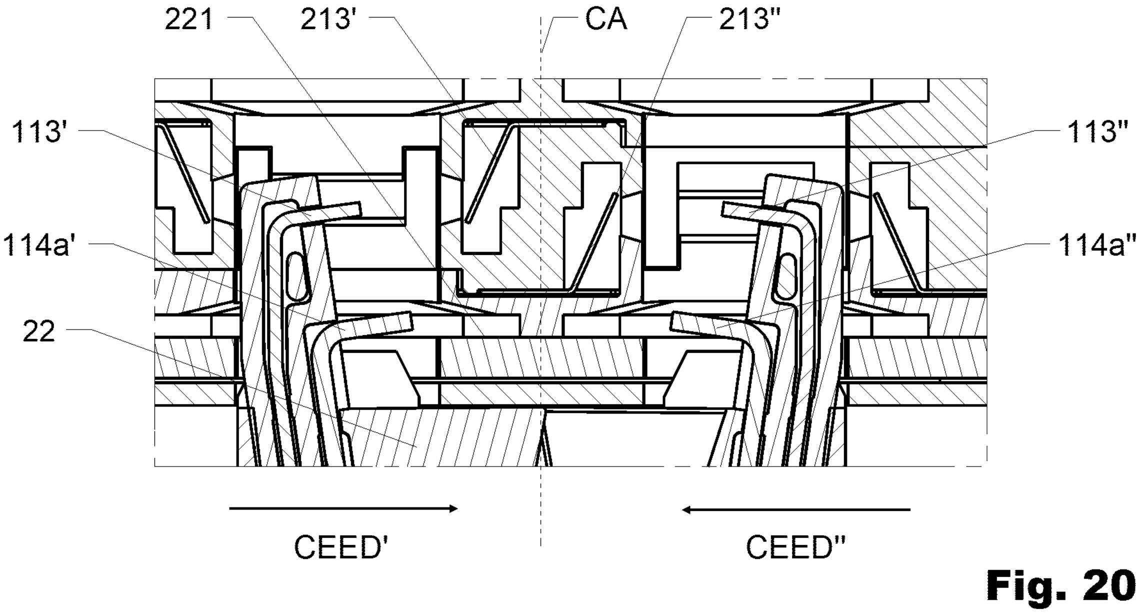
FIG. 20 shows a detail of FIG. 19.

FIG. 19 shows a corresponding sectional view, with the electrical connector 1 and the electrical counter connector arrangement 2 being in their coupling position in proximal-distal-direction but prior to engagement. FIG. 20 shows a detail of FIG. 19.

Figure 27:
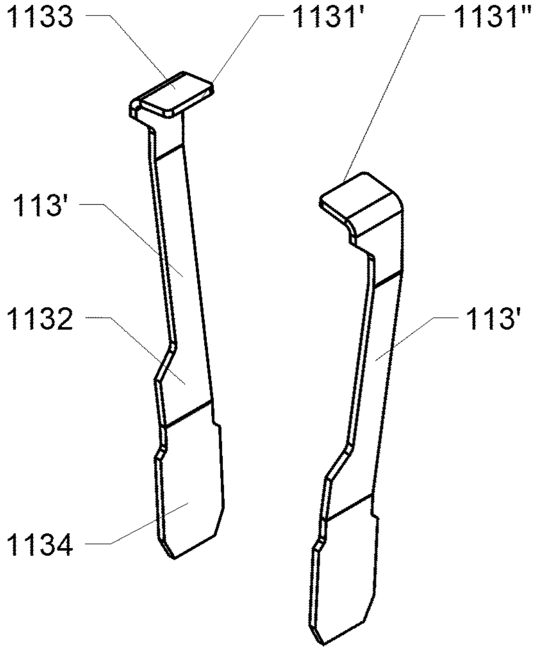
FIG. 27 shows the main connector element contacts of the electrical connector in a perspective view.

In the shown design, the first and second main connector element contacts 113', 113" are in each case formed by a press-bent sheet metal part, as best visible in FIG. 27, showing the first and second main connector element contacts 113', 113" in a perspective view. The main connector element contacts 113', 113" are in this design generally shaped identically. They are of generally L-shaped design with a longer first leg 1132 and a shorter second leg 1133. In an assembled state, the longer leg extends generally along the respective connector element axis. The shorter leg 1133 carries the first main connector element contact surface 1131' respectively second main connector element contact surface 1131" as front surface. In the shown design, the first and second main connector element contact surfaces 1131', 1131" point towards each other. At the respective proximal end of the first leg 1132, opposite to the second leg 1133, the first and second main connector element contact 113', 113" carry in each case a respective main connector element contacting flap 1134 for connecting with a phase respectively neutral conductor of an electrically device, for example a lamp, via a respective cable shoe.

Figure 25:
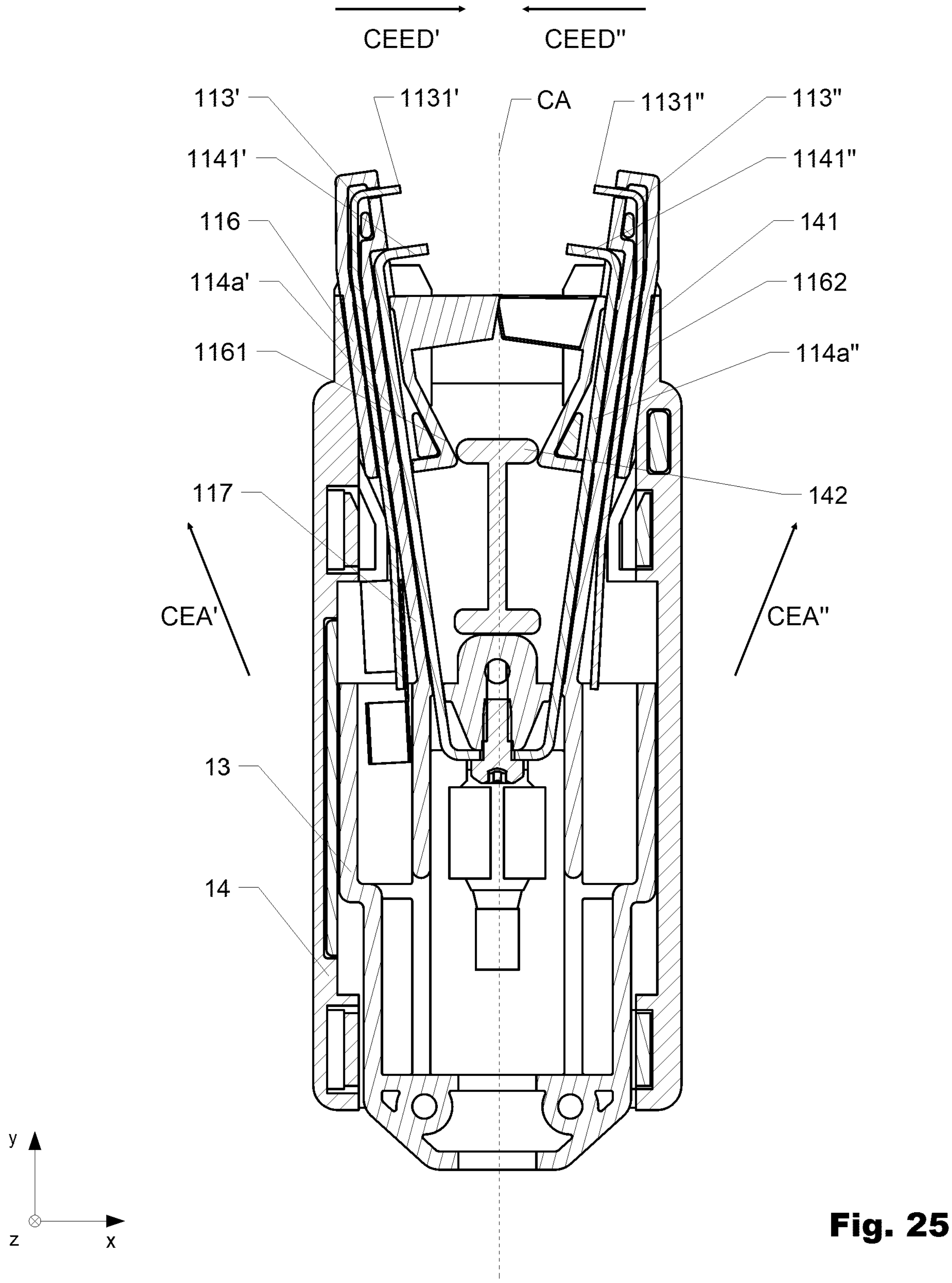
FIG. 25 shows the electrical connector of the arrangement according to FIG. 18 in a sectional view.
Figure 26:
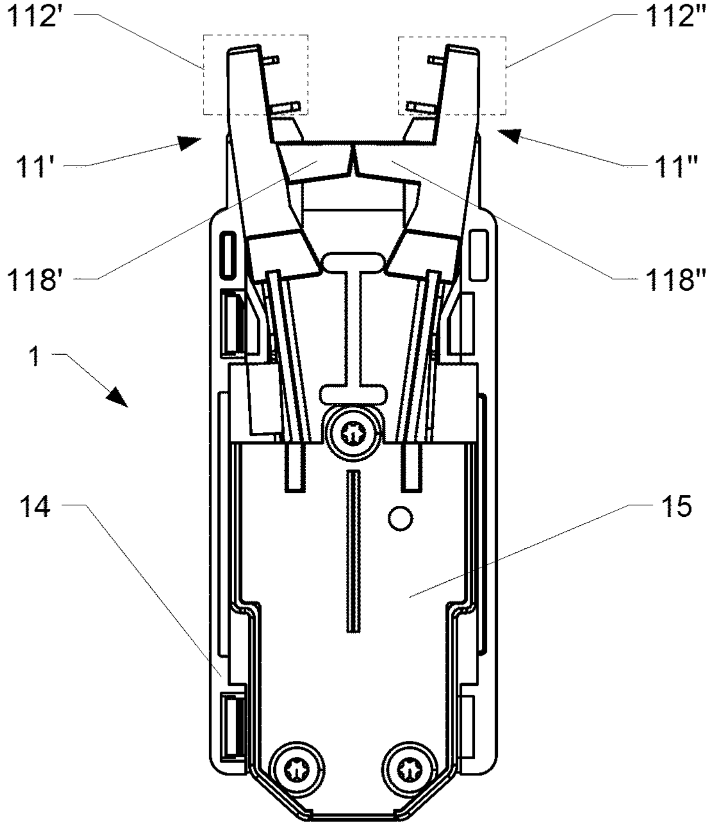
FIG. 26 shows the electrical connector element in a partly assembled view.

FIG. 25 and FIG. 26 shows the electrical connector 1 in a sectional respectively partly assembled view. As best visible in FIG. 25, the first respectively second electrical contact element, 11', 11", include in each case a respective insulating member 116 which is made from e.g. injection-molded plastics. The insulating members are elongated and generally extend in each case along the respective connector element axis CEA', respectively CEA". The first respectively second main connector element contact, 113', 113" are in each case carried and extend partly through the respective insulating member 116. The second leg 1133 of the first respectively second main connector element contact 113', 113" extends or projects in each case out of the respective insulating member 116, such that the first respectively second main connector element contact surfaces 1131', 1131" are accessible for contacting, pointing towards the connector axis CA. The insulating members 116 are connected to or merge in each case into an elongated and generally tongue-shaped mounting member 117 that extends generally along the first respectively second connector element axis CEA' respectively CEA". At their respective proximal end, the mounting members 117 are in each case connected to or merge into a base element 13. In the shown design, the insulating members 116, the mounting members 117 and the base element 13 may in each case be realized in an integral manner as injection-molded plastic component.

Figure 28:
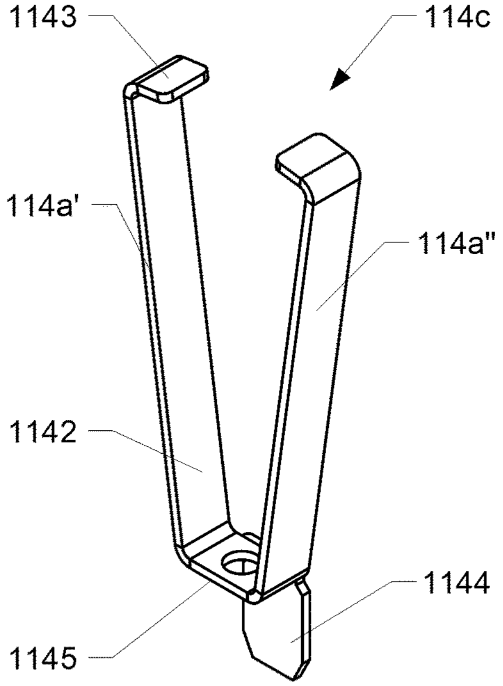
FIG. 28 shows the engagement auxiliary connector element contacts of the electrical connector in a perspective view.

The first respectively second electrical connector element 11', 11" further includes a first respectively second engagement auxiliary connector element contact **114*a*', 114*a*" which are, as such formed similar to the main connector element contacts 113', 113", having in each case a longer first leg 1142 and a shorter second leg 1143 as best visible in FIG. 28. The longer leg 1142 extends in each case parallel to the longer leg 1132 of the respective main connector element contact 113', 113". As best visible in FIG. 25, the first respectively second engagement auxiliary connector element contact 114*a*', 114*a*" is in each case arranged adjacent to the respective insulating member 116, with the auxiliary connector element contact 114*a*', 114*a*"** facing each other.

Each of the second legs 1143 extends parallel to the second leg 1133 of the respective main connector element contact 113', 113", but offset in proximal direction. The first respectively second auxiliary connector element contact surface, 1141', 1141" is in each case given by the proximal surface of the respective second leg 1143. Further, the second legs 1143 of the engagement auxiliary connector element contacts **114*a*', 114*a*" extend somewhat further from the respective insulating member 116 towards the connector axis CA as compared to the second legs 1133 of the main connector element contacts 113', 113". As best visible in FIG. 28, the first and second engagement auxiliary connector element contacts 114*a*', 114*a*" are formed integrally as a combined press-bent auxiliary contact sheet metal part 114*c* together with an auxiliary connector element base 1145. From the auxiliary connector element base, 1145, the auxiliary connector element contacts 114*a*', 114*a*" extend in distal direction. Further at the auxiliary connector element base 1145, an integrally formed auxiliary connector element contacting flap 1144 is arranged for connecting a grounding conductor via a cable shoe (visible in FIG. 25, not referenced). The auxiliary connector element base 1145 has in the shown design a bore (not referenced) for mounting the auxiliary connector element by screwing to the base element 13 (visible in FIG. 25**).

The second legs 1143, specifically the first respectively second auxiliary connector element contact surface 1141', 1141" separates for the first respectively second electrical connector element 11', 11" the proximal connector element body from the first respectively second insertion part 112', 112" (see FIG. 26).

In the shown design, the electrical connector 2 further comprises a base element cover 15 (see FIG. 26) that is assembled with the base element 13 by way of screwing or another method as known in the art. The base element cover 15 covers an inner room of the base element 13 in which the proximal ends of the first and second main connector element contact 113' 113" (respectively their first legs 1132) with their respective main connector element contacting flap 1134 as well as the proximal ends of the first and second engagement auxiliary connector element contact **114*a*', 114*b* (respectively their first legs 1142) and the auxiliary connector element base 1145 with the auxiliary connector element contacting flap 1144 are arranged. Also, the electrical connection via cable shoes is the room covered by base element cover 15 (see FIG. 25 where the base element cover 15 is not shown). The base element 13 and the base element cover 15 form, in combination an inner housing that is arranged inside and in particular circumferentially surrounded by the connector housing 14**.

For moving the first and second electrical connector element 11', 11" into their respective connector element engagement direction CEED', CEEED" respectively towards the connector axis CA, the following arrangement is provided in the shown design, as best visible in FIG. 25. The connector element bodies respectively the insulating members 116 have in each case at their outside an engagement sliding surface 1162. The engagement sliding surfaces 1162 are inclined from proximal towards distal away from the connector axis CA. A sleeve-shaped connector housing 14 is arranged displaceable along the connector axis CA and has at its distal end an engagement pushing member 141 which contacts the engagement sliding surface 1162. In the shown design, the engagement pushing member 141 has an inclined surface in areal contact with the engagement sliding surface 1162. When moving the connector housing 14 in distal direction, the engagement pushing members 141 will press on the respective engagement sliding surfaces 1162, thereby forcing the connector elements 11', 11" towards the connector axis CA, under some deflection of the mounting members 117. In the final state, the connector element axes CEA', CEA" are parallel or substantially parallel to the connector axis CA.

For moving the first and second electrical connector element 11', 11" against their respective connector element engagement direction CEED', CEEED" respectively away from the connector axis CA, the connector element bodies respectively the insulating members 116 have in each case at their inner side an inclined disengagement sliding surface 1161. Between the disengagement sliding surfaces 1161, disengagement pushing member 142 are arranged on both sides of the connector axis CA, the disengagement pushing members 142 being in the shown design an integral part of the connector housing 14. When moving the connector housing 14 in the proximal direction, the disengagement pushing members 142 will in each case press on the respective disengagement sliding surface 1161, thereby forcing the connector elements 11', 11" away from the connector axis CA into the configuration shown in FIG. 25.

Both movements are accordingly carried out in a positively guided manner. Further in this design, the connector housing 14 serves at the same time as engagement control member and as biasing member that biases the first and second electrical connector element 11', 11" towards each other via the force exerted by the engagement pushing members 141 onto the engagement sliding surfaces 1162.

In the shown design, the connector housing 14 is two-parted, with the two parts being connected e.g. via snap-fitting or another suited method as generally known in the art. Alternatively, the parts of the connector housing may be assembled by way of screwing, gluing, or the like.

Figure 21:
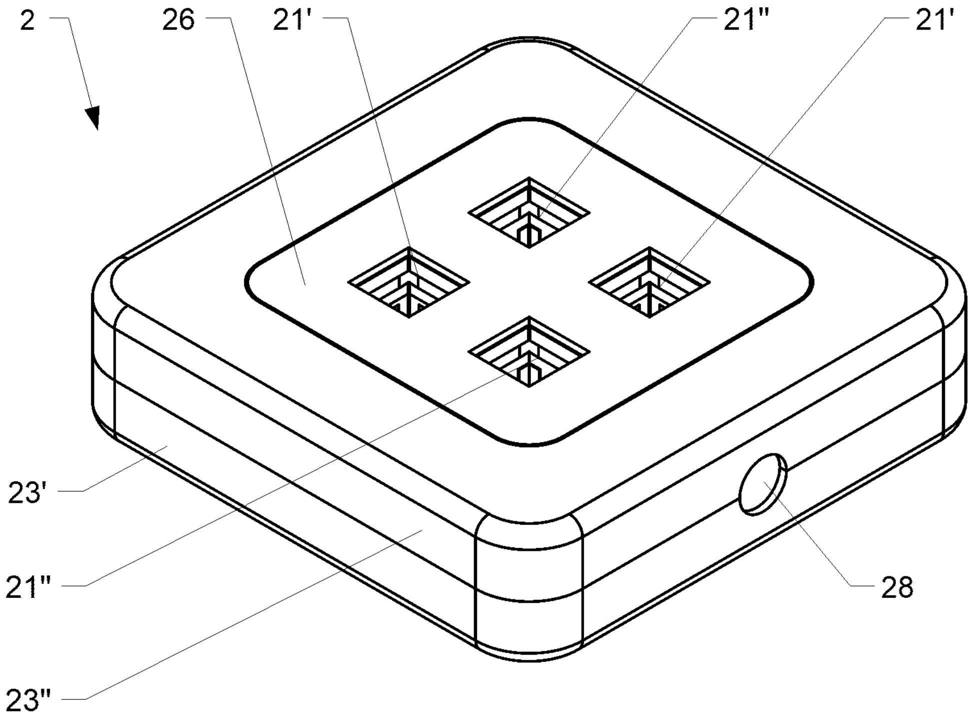
FIG. 21 shows the counter connector arrangement of FIG. 18 in a perspective view.

FIG. 21 is a perspective view of an electrical counter connector arrangement 2 for coupling with electrical connectors 1 of the before-discussed type. The electrical counter connector arrangement 2 has a first group holding member 23' and a second group holding member 23" that are in the shown design configured to be assembled by way of screwing (see screw holes (not referenced) in FIG. 22). Other assembly methods may be used as well. The first group holding member 23' and the second group holding member 23" form, in combination, a housing of the counter connector arrangement 2. Like the spacer member 24 as described further below, they may be made, e.g., from injection-molded plastics. In the shown example, the electrical counter connector arrangement 2 comprises two first group counter connector elements 21' and two second group counter connector elements 21". Any other, in particular larger number of first and second counter connector elements, however, is possible in dependence of the application.

Figure 22:
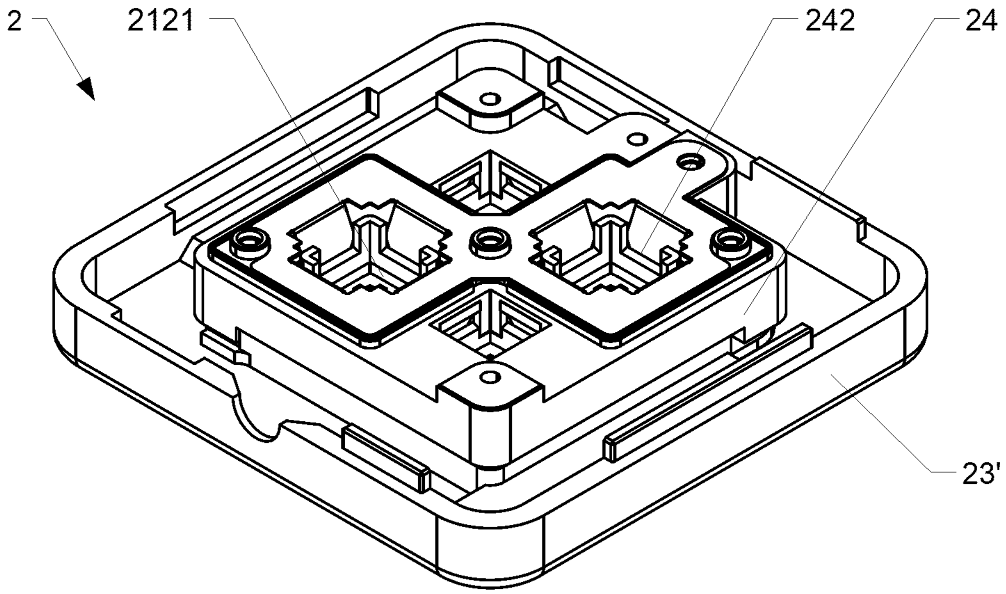
FIG. 22 shows the counter connector arrangement in a partly assembled perspective view.
Figure 23:
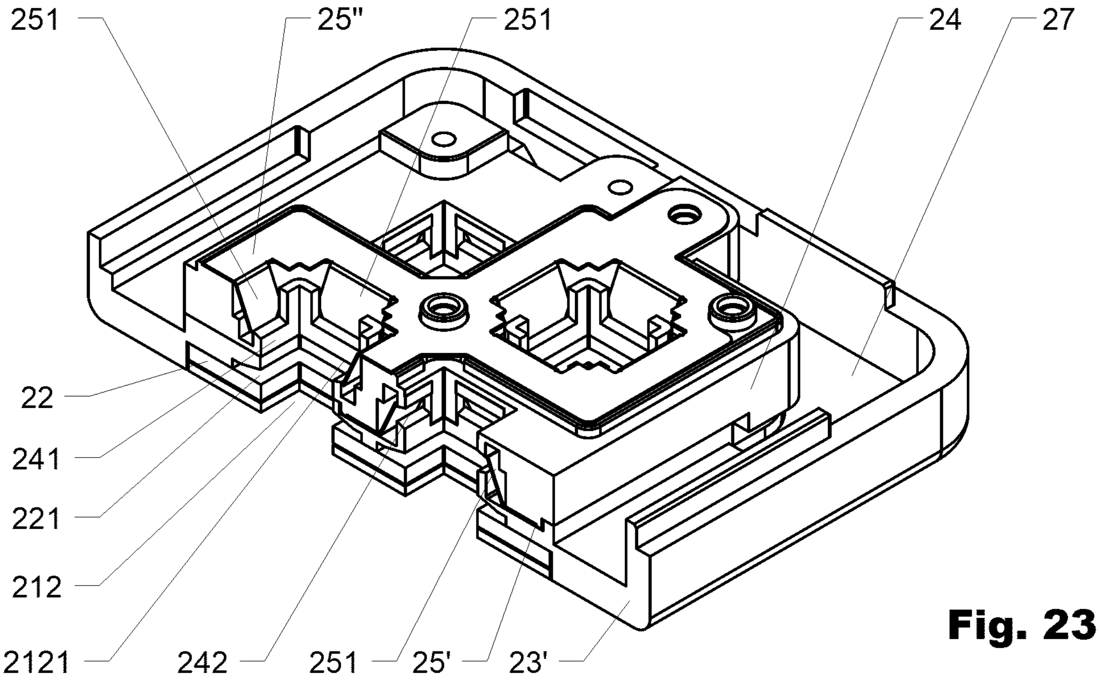
FIG. 23 shows a sectional perspective view corresponding to FIG. 22.
Figure 24:
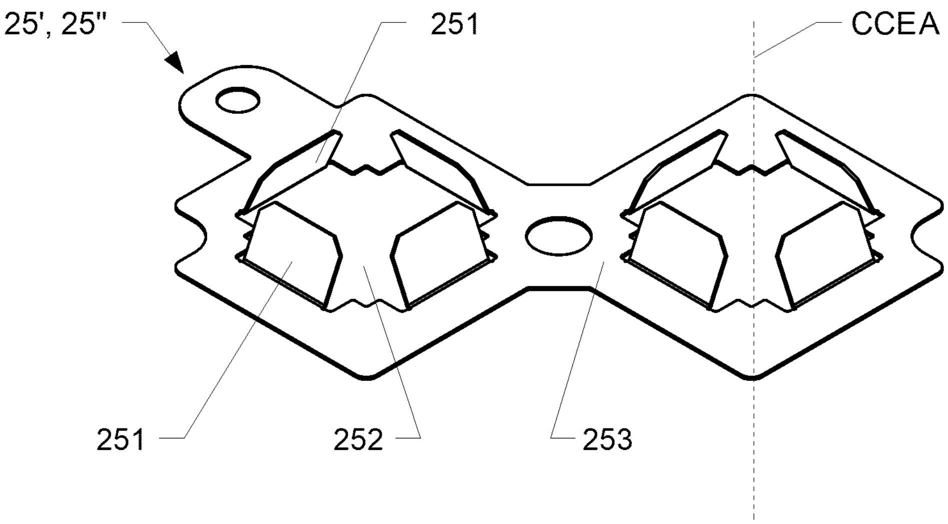
FIG. 24 shows a counter contact member of the counter connector arrangement in a perspective view.

FIG. 22 shows the electrical counter connector arrangement 2 in a view similar to FIG. 21, but with the second group holding member 23" being removed. FIG. 23 is a corresponding perspective sectional view. FIG. 24 shows first group counter contact member 25' and second group counter contact member 25" in a perspective view. As explained in the following, the first group counter contact member 25' and the second group counter contact member 25" may be designed identically and differ only with respect to their mounting orientation. The counter contact members 25', 25" are favorably realized as press-bent sheet metal parts. For a larger number of electrical counter connector elements 21', 21", the first group counter contact member 25' and second group counter contact member 25" may be modified accordingly. Additionally or alternatively, more than one first group counter contact member 25' and/or second group counter contact member 25" may be foreseen for practical purposes and provided in a side-by-side arrangement, each associated with a number of first group counter connector elements 21' or second group counter connector elements 21", respectively.

As best visible in FIG. 23, the first group counter contact member 25' is sandwiched between the first group holding member 23' and the spacer member 24. Similarly, the second group counter contact member 25" is sandwiched between the second group holding member 23" and the spacer member 25". As best visible in FIG. 24, the counter contact members 25', 25" have in each case a substantially square cut-out 252, with a flap 251 projecting from each side of the circumferential rim of cut-out 252 to the same side. Each flap is a counter connector element contact segment and its inner surface serves as main counter connector element contact surface segment 21311. In combination, such four flaps 251 serve as first group main counter connector element contact 213' if belonging to the first group counter connector member 25' and as second group main counter connector element contact 213" if belonging to the second group counter connector member 25".

As best visible in FIG. 23, the first and second group holding members 23', 23" as well as the spacer member 24 have in each case a through-going cut-out (not referenced) for each first group counter connector element 21' and second group counter connector element 21", which are in each case aligned with the respective cut-out 252, thereby forming a through-going continuous channel through which the respective counter connector element axis extends. For each electrical counter connector element 21', 21", the channel includes the respective receiving room 2121 and in this design a receiving aperture 212 at each of its ends along the counter connector element axis.

As best visible in FIG. 20 and FIG. 23, the flaps 251 of the first group counter contact member 25' and of the second group counter contact member 25" project in each case into the respective cut-out of the spacer member 24 from opposite sides but in an overlapping manner in axial-distal direction. The flat base portion 253 of each counter contact member 25', 25" ins in areal contact with the respective holding member 23', 23" and the spacer member 24 and sandwiched there between.

The electrical counter connector arrangement further has to generally identically designed auxiliary counter connector contact members 22. The auxiliary counter connector contact members 22 have respective cut-out for first and second group electrical counter connector element 21', 21", symmetrically to the respective counter connector element axis. The auxiliary counter connector contact members are generally plate-shaped and made from metal. At the outside, the auxiliary counter connector members 22 are in each case covered with a respective non-conductive plate-shaped cover member 26 in this design, with the cover members 26 being in each case adhesively fixed.

In the shown design, the cover members 26 are in each case arranged in a corresponding recess of the reactive holding member 23' 23" such that a smooth outer surface is achieved. Further, the cover members 26 cover the screws view which the holding members 23', 23" are connected (see position of screw holes in FIG. 22).

In the shown design, an auxiliary counter connector contact member 22 and cover member 26 form, in combination, a counter connector element front member for all first and second group counter connector elements 21', 21". An inner surface of the auxiliary counter connector contact members 22 forms in each case a combined counter engagement step surface 221 (see FIG. 23) for all first and second group counter connector elements 21', 21".

When inserting a distal part of the electrical connector element 1, in particular the insertion parts 112', 112" of the first and second electrical connector elements 11', 11", into the receiving rooms 2121 of two neighboring electrical counter connector elements 21', 21" and subsequently moving the connector housing 14 in the distal direction towards the electrical counter connector arrangement 2, the second legs 1143 engage behind the auxiliary counter connector contact member 22, with the auxiliary connector element contact surfaces 1141', 1141" contacting the counter engagement step surface 221. Simultaneously, the main connector element contact surfaces 1131', 1131" frontally contact the main counter connector element surfaces respectively in each case a corresponding main counter connector element contact surface segment 21311. Further, the connector housing 14 presses against the counter connector element front member, such that a pressing force exists between the auxiliary connector element contact surfaces 1141', 1141" and the counter engagement step surface 221. Thereby, a good coupling can be achieved generally independent from the orientation with respect to gravity.

To ensure a smooth movement, the connector element bodies, specifically the insulating members 116, comprise in each case an integrally formed guiding member 118', 118", the guiding members 118', 118" facing each other. When moving the first insertion electrical connector elements 11, 11' towards each other, the guiding members 118', 118" engage with each other.

In the shown design, one of the counter contact member 25', 25" may be connected to a phase conductor and the other may be connected to a neutral conductor of a supply cable, while the auxiliary counter connector contact members 22 may be connected to a ground conductor. For the cabling, a circumferential wiring room (referenced in FIG. 23) with a cable opening 28 (referenced in FIG. 21) is provided in the shown design.

As best visible in FIG. 23, the circumferential inner surface of the receiving rooms 2121 are in each case divided by a touch protection member 241 into a central compartment and a peripheral compartment (compartments not individually referenced). The counter connector element axis extends in each case through the central compartment of the respective receptive receiving room 1121, while the main counter connector element contacts, respectively in the shown design the flaps 251, are arranged in the peripheral compartment. The central compartment and the peripheral compartment are connected via contact access windows 242 in the form of through-going apertures of the touch protection members 241. Via the contact access windows 242, the main counter connector element contacts respective in the shown design the flaps 251 are accessible for contacting. The touch protection members 241 and contact access windows 242 provide a touch protection when mistakenly introducing e.g. a finger or metal object into the receiving room 2121 of a counter connector element 21', 21". In a design with a segmented main counter connector element contact—with each segment being given by a flap 251, a contact access window 242 is generally present per segment respectively flap 251. Apart from the access windows 241, the touch protection member is favorably circumferentially through-going respectively continuous.

In the shown design, the touch protection members are formed integrally with the spacer member 24 which, however is not essential. Further, it is noted that touch protection members may also be present in other designs of counter connector arrangements as well as for single electrical counter connector elements in accordance with the present disclosure.

It is noted that the here-described design of the electrical counter connector arrangement 2 may be designed for any desired number of rows and columns of first group electrical counter connector elements 21' and second group counter connector elements 21". Further in the shown design, electrical connectors 1 may be coupled from both sides, which, however, is not essential. An embodiment where coupling is possible only from one side e.g. the proximal side, may be suited e.g. for mounting on a wall or ceiling.

REFERENCE SIGNS

1 electrical connector
11, 11', 11" electrical connector element
11*p* proximal connector element end
111, 111', 111" connector element body
111*p* proximal part of connector element body
111*d* distal part of connector element body
112, 112', 112" insertion part
112*p* proximal portion of insertion part
112*d* distal portion of insertion part
1121 engagement step
1111 surface element
11211 engagement step surface
113, 113', 113" main connector element contact
1131, 1131', 1131" main connector element contact surface
1132 first leg of main connector element contact
1133 second leg of main connector element contact
1134 main connector element contacting flap
114 auxiliary connector element contact
114*a*', 114*a*" engagement auxiliary connector element contact
114*b* auxiliary connector element base
114*c* auxiliary contact sheet metal part
1141, 1141', 1141" auxiliary connector element contact surface
1142 first leg of auxiliary connector element contact
1143 second leg of auxiliary connector element contact
1144 auxiliary connector element contacting flap
1145 auxiliary connector element base
115 main connector element coupling wire
1151 conductor aperture
116 insulating member
1161 disengagement sliding surface
1162 engagement sliding surface
117 mounting member
118', 118" guiding member
12 biasing member
13 base element
14 connector housing
base element cover
141 engagement pushing member
142 disengagement pushing member
2 electrical counter connector arrangement
21, 21', 21" electrical counter connector element
211 counter connector element front member
2111 proximal front member side
2112 distal front member side
212 receiving aperture
2121 receiving room
213, 213', 213" main counter connector element contact
2131 main counter connector element contact surface
21311 main counter connector element contact surface segments
214*a*, 214*b*, 211*a*', 214*a*" auxiliary counter connector element contact
2141*a*, 2141*b* auxiliary counter connector element contact surface

215 counter connector element contact carrier
22 auxiliary counter connector contact member
221 counter engagement step surface
23', 23" holding member
24 spacer member
241 touch protection member
242 contact access window
25', 25" counter contact member/sheet metal component
251 flap
252 cut-out
253 base portion
26 cover member
27 wiring room
28 cable opening
3 electrical device
31 electrically powered load
311 lighting element
PY proximal connector element direction
dY distal connector element direction
PY" proximal counter connector element direction
dY distal counter connector element direction
A row
B column
C center
CEA, CEA', CEA" connector element axis
CEED connector element engagement direction
CEED', CED" connector element engagement direction
CCEA counter connector element axis
CA connector axis
N normal direction of engagement step surface

The invention claimed is:

1. An electrical connector including a first and a second electrical connector element, wherein each of the first and the second electrical connector elements include:

an elongated connector element body, the connector element body extending along a connector element axis, the connector element axis defining a proximal connector element direction and a distal connector element direction opposite to the proximal connector element direction, an insertion part, the insertion part being distally adjacent to the connector element body, wherein an engagement step with an engagement step surface is formed at a transition from the connector element body to the insertion part, the engagement step surface extending in a connector element engagement direction transverse to the connector element axis and outwards with respect to the connector element body, a main connector element contact, the main connector element contact having a main connector element contact surface, the main connector element contact surface being arranged at the insertion part, the main connector element contact surface being frontally contactable by a movement of the electrical connector element in the connector element engagement direction, wherein the first insertion part of the first electrical connector element and the second insertion part of the second electrical connector element are arranged on opposite sides with respect to a longitudinal connector axis, the electrical connector further including a biasing member, the biasing member being connected the first connector element body of the first electrical connector element and the second connector element body of the second electrical connector element, wherein a first connector element engagement direction of the first electrical connector element and a second connector element engagement direction of the second electrical connector element are alternatively either pointing towards each other or pointing away from each other, wherein the biasing member is configured to bias the first insertion part of the first electrical connector element and the second insertion part of the second electrical connector element towards each other if the first and second connector element engagement direction are pointing towards each other, or, alternatively, to bias the first insertion part of the first electrical connector element and the second insertion part of the second electrical connector element away from each other if the first and second connector element engagement direction are pointing away from each other, wherein the first electrical connector element and/or of the second electrical connector element further include one or more auxiliary connector element contacts distinct from the main connector element contact, the auxiliary connector element contacts each having a respective auxiliary connector element contact surface arranged at the insertion part.

2. The electrical connector according to claim 1, wherein at least one auxiliary connector element contact surface of an engagement auxiliary connector element contact is arranged at the engagement step surface and/or forms the engagement step surface fully or in part.

3. The electrical connector according to claim 1, wherein the main connector element contact of the first electrical connector element and/or of the second electrical connector element is an L-shaped or substantially L-shaped sheet metal part having a first leg and a second leg, wherein the first leg extends along respectively parallel to the connector element axis, and wherein the main connector element contact surface is formed by a front surface of the second leg in a viewing direction aligned with the connector element engagement direction.

4. The electrical connector according to claim 1, wherein the first and/or second electrical connector element includes an insulating member, wherein the main connector element contact is supported or carried by the insulating member.

5. The electrical connector according to claim 1, wherein the main connector element contact surface is planar for the first and/or the second electrical connector element.

6. The electrical connector according to claim 1, wherein the engagement step is formed, in combination, by adjacent surface elements of an auxiliary connector element contact for the first and/or the second electrical connector element.

7. The electrical connector according to claim 1, wherein the first and second insertion part are of identical or mirror-symmetric design and dimensions.

8. The electrical connector according to claim 1, wherein the electrical connector includes a base element from which the first and second electrical connector elements project, wherein the first and second electrical connector elements are in each case formed at least partly integrally with the base element.

9. The electrical connector according to claim 1, wherein the electrical connector includes a manually operable engagement control member, the engagement control member being configured to move the first and second insertion part into their respective connector element engagement direction and alternatively against their respective connector element engagement direction.

10. The electrical connector according to claim 9, wherein the engagement control member is configured to move the first and second insertion parts by way of positive guidance.

11. The electrical connector according to claim 9, wherein the biasing member is formed integrally with the engagement control member.

12. The electrical connector according to claim 9, wherein the engagement control member is configured for moving the first and second insertion parts by moving the engagement control member along the longitudinal connector axis.

13. The electrical connector according to claim 9, wherein the biasing member is tubular respectively sleeve-shaped and circumferentially encompasses a portion of the first and second connector element body.

14. An electrical counter connector arrangement including a number of electrical counter connector elements, wherein each of the electrical counter connector elements include:

a counter connector element front member, the counter connector element front member having a proximal front member side and a thereto parallel distal front member side, a receiving aperture, the receiving aperture extending continuously between the proximal and distal front member side, wherein a counter connector element axis extends through the receiving aperture, the counter connector element axis defining a proximal counter contact element direction and a distal counter connector element direction opposite to the proximal counter connector element direction, wherein the receiving aperture opens into a receiving room distal from the counter connector element front member, the receiving room being configured to receive an insertion part of an electrical connector element via the receiving aperture, a main counter connector element contact, the main counter connector element contact being arranged distal from the counter connector element front member, the main counter connector element contact having a main counter connector element contact surface, the main counter connector element contact surface being laterally set back with respect to the receiving aperture, the main counter connector element contact surface laterally delimiting the receiving room, such that, by introducing the insertion part into the receiving room via the receiving aperture in the distal counter connector element direction and subsequently displacing the electrical connector element in a connector element engagement direction, the counter connector element front member engages with a connector element engagement step and the main counter connector element contact surface electrically contacts the main counter connector element contact surface, wherein the electrical counter connector elements are divided into a first group of electrical counter connector elements and a second group of electrical counter connector elements, wherein the main counter connector element contacts of all electrical counter connector elements belonging to the first group are electrically connected among each other, but not with the main counter connector element contacts of the counter connector elements belonging to the second group, and wherein the main counter connector element contacts of all electrical counter connector element belonging to the second group are electrically connected among each other, but not with the main counter connector element contacts of the electrical counter connector elements belonging to the first group, wherein at least one electrical counter connector element further includes one or more auxiliary counter connector element contacts distinct from the main counter connector element contact, the auxiliary counter connector element contacts being arranged distal from the counter connector element front member, wherein the receiving aperture is circumferentially closed for each electrical counter connector element.

15. The electrical counter connector arrangement according to claim 14, wherein the number of electrical counter connector elements belonging to the first group and the number of electrical counter connector elements belonging to the second group is one in each case.

16. The electrical counter connector arrangement according to claim 14, wherein the electrical counter connector elements are arranged in a side-by-side arrangement as a matrix of rows and columns, wherein the rows and the columns are equally distributed and a distance between adjacent rows corresponds to the distance between adjacent columns, wherein within each row and each column electrical counter connector elements belonging to the first group are arranged with electrical counter connector elements belonging to the second group in an alternating manner.

17. The electrical counter connector arrangement according to claim 14, further including at least one auxiliary counter connector contact member, the at least one auxiliary counter connector contact member serving as integrally formed auxiliary counter connector element contact of some or all electrical counter connector elements, wherein the at least one auxiliary counter connector contact member is integrally formed with the counter connector element front member or part of the counter connector element front member of some or all electrical counter connector elements.

18. The electrical counter connector arrangement according to claim 14, wherein the counter connector element front members of the electrical counter connector element are formed integrally.

19. The electrical counter connector arrangement according to claim 14, wherein a contour of the receiving aperture is square or hexagonal for each electrical counter connector element.

* * * * *